(12) United States Patent
Kim et al.

(10) Patent No.: US 10,051,364 B2
(45) Date of Patent: *Aug. 14, 2018

(54) SINGLE CHANNEL OR MULTI-CHANNEL AUDIO CONTROL INTERFACE

(71) Applicant: QUALCOMM Incorporated, San Diego, CA (US)

(72) Inventors: Lae-Hoon Kim, San Diego, CA (US); Erik Visser, San Diego, CA (US); Raghuveer Peri, San Diego, CA (US); Phuong Lam Ton, San Diego, CA (US); Jeremy Patrick Toman, San Diego, CA (US); Troy Schultz, San Diego, CA (US); Jimeng Zheng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 14/789,766

(22) Filed: Jul. 1, 2015

(65) Prior Publication Data

US 2016/0004499 A1  Jan. 7, 2016

Related U.S. Application Data

(60) Provisional application No. 62/020,928, filed on Jul. 3, 2014.

(51) Int. Cl.
*H04R 3/00* (2006.01)
*G06F 3/0487* (2013.01)
(Continued)

(52) U.S. Cl.
CPC .......... *H04R 3/005* (2013.01); *G06F 3/0484* (2013.01); *G06F 3/0487* (2013.01);
(Continued)

(58) Field of Classification Search
CPC ...................................................... H04R 3/005
See application file for complete search history.

(56) References Cited

U.S. PATENT DOCUMENTS

| 7,499,969 B1 * | 3/2009 | van Os | H04M 3/56 |
| | | | 709/203 |
| 8,175,295 B2 | 5/2012 | Oh et al. | |

(Continued)

FOREIGN PATENT DOCUMENTS

| CN | 102007532 A | 4/2011 |
| GB | 2258098 A | 1/1993 |
| WO | 2014032709 A1 | 3/2014 |

OTHER PUBLICATIONS

International Preliminary Report on Patentability from International Application No. PCT/US2015/039065, dated Jun. 27, 2016, 7 pp.

(Continued)

*Primary Examiner* — William Bashore
*Assistant Examiner* — Nathan Shrewsbury
(74) *Attorney, Agent, or Firm* — Shumaker & Sieffert, P.A.

(57) ABSTRACT

A method of processing audio may include receiving, by a computing device, a plurality of real-time audio signals outputted by a plurality of microphones communicatively coupled to the computing device. The computing device may output to a display a graphical user interface (GUI) that presents audio information associated with the received audio signals. The one or more received audio signals may be processed based on a user input associated with the audio information presented via the GUI to generate one or more processed audio signals. The one or more processed audio signals may be output to, for example, one or more output devices such as speakers, headsets, and the like.

30 Claims, 12 Drawing Sheets

(51) Int. Cl.
*G06F 3/0484* (2013.01)
*G06F 3/16* (2006.01)
*H04S 7/00* (2006.01)
*H04R 29/00* (2006.01)
*G10L 21/0208* (2013.01)

(52) U.S. Cl.
CPC .......... *G06F 3/04847* (2013.01); *G06F 3/165* (2013.01); *G06F 3/167* (2013.01); *H04R 29/008* (2013.01); *H04S 7/30* (2013.01); *H04S 7/40* (2013.01); *G10H 2210/305* (2013.01); *G10H 2220/096* (2013.01); *G10H 2220/106* (2013.01); *G10H 2220/211* (2013.01); *G10H 2220/355* (2013.01); *G10H 2230/015* (2013.01); *G10L 21/0208* (2013.01); *H04R 2430/01* (2013.01)

(56) References Cited

U.S. PATENT DOCUMENTS

| | | | |
|---|---|---|---|
| 8,239,768 B2* | 8/2012 | Sokol | H04N 7/17318 381/109 |
| 8,712,076 B2 | 4/2014 | Dickins | |
| 2008/0253592 A1 | 10/2008 | Sanders et al. | |
| 2008/0259731 A1 | 10/2008 | Happonen | |
| 2009/0132075 A1 | 5/2009 | Barry | |
| 2010/0008519 A1 | 1/2010 | Hayakawa et al. | |
| 2010/0040217 A1* | 2/2010 | Aberg | H04L 12/1822 379/202.01 |
| 2010/0066919 A1* | 3/2010 | Nakajima | H04B 1/205 348/734 |
| 2011/0141233 A1* | 6/2011 | Tsukagoshi | H04N 7/52 348/43 |
| 2011/0149024 A1* | 6/2011 | Tsukagoshi | H04N 21/438 348/42 |
| 2011/0257974 A1 | 10/2011 | Kristjansson et al. | |
| 2011/0289410 A1 | 11/2011 | Paczkowski et al. | |
| 2012/0078402 A1 | 3/2012 | Crockett et al. | |
| 2012/0121105 A1* | 5/2012 | Holladay | H04R 27/00 381/81 |
| 2013/0054231 A1 | 2/2013 | Jeub et al. | |
| 2013/0272539 A1 | 10/2013 | Kim et al. | |
| 2013/0315402 A1 | 11/2013 | Visser et al. | |
| 2013/0332157 A1 | 12/2013 | Iyengar et al. | |
| 2013/0342730 A1 | 12/2013 | Lee et al. | |
| 2014/0050454 A1 | 2/2014 | Slotte | |
| 2014/0105411 A1 | 4/2014 | Santos et al. | |
| 2014/0115470 A1 | 4/2014 | Meaney et al. | |
| 2014/0133665 A1 | 5/2014 | Xiang et al. | |
| 2014/0163982 A1 | 6/2014 | Daborn et al. | |
| 2014/0191759 A1* | 7/2014 | Olsson | G01V 3/08 324/329 |
| 2015/0296247 A1* | 10/2015 | Glasser | H04L 65/4084 725/74 |
| 2016/0004405 A1 | 1/2016 | Kim et al. | |
| 2016/0246564 A1 | 8/2016 | Uimonen et al. | |

OTHER PUBLICATIONS

International Search Report and Written Opinion from International Application No. PCT/US2015/039065, dated Sep. 30, 2016, 11 pages.

Response to Written Opinion dated Sep. 30, 2015, from International Application No. PCT/US2015/039065, filed on Apr. 28, 2016, 5 pp.

Apple Inc: "Soundtrack Pro 3 User Manual," Mar. 17, 2010 (Mar. 17, 2010), XP55446785, Retrieved from the Internet: https://documentation.apple.com/en/soundtrackpro/usermanual/Soundtrack%20Pro%203%20User%20Manual%20(en).pdf, 542 pages, [retrieved on Feb. 1, 2018].

* cited by examiner

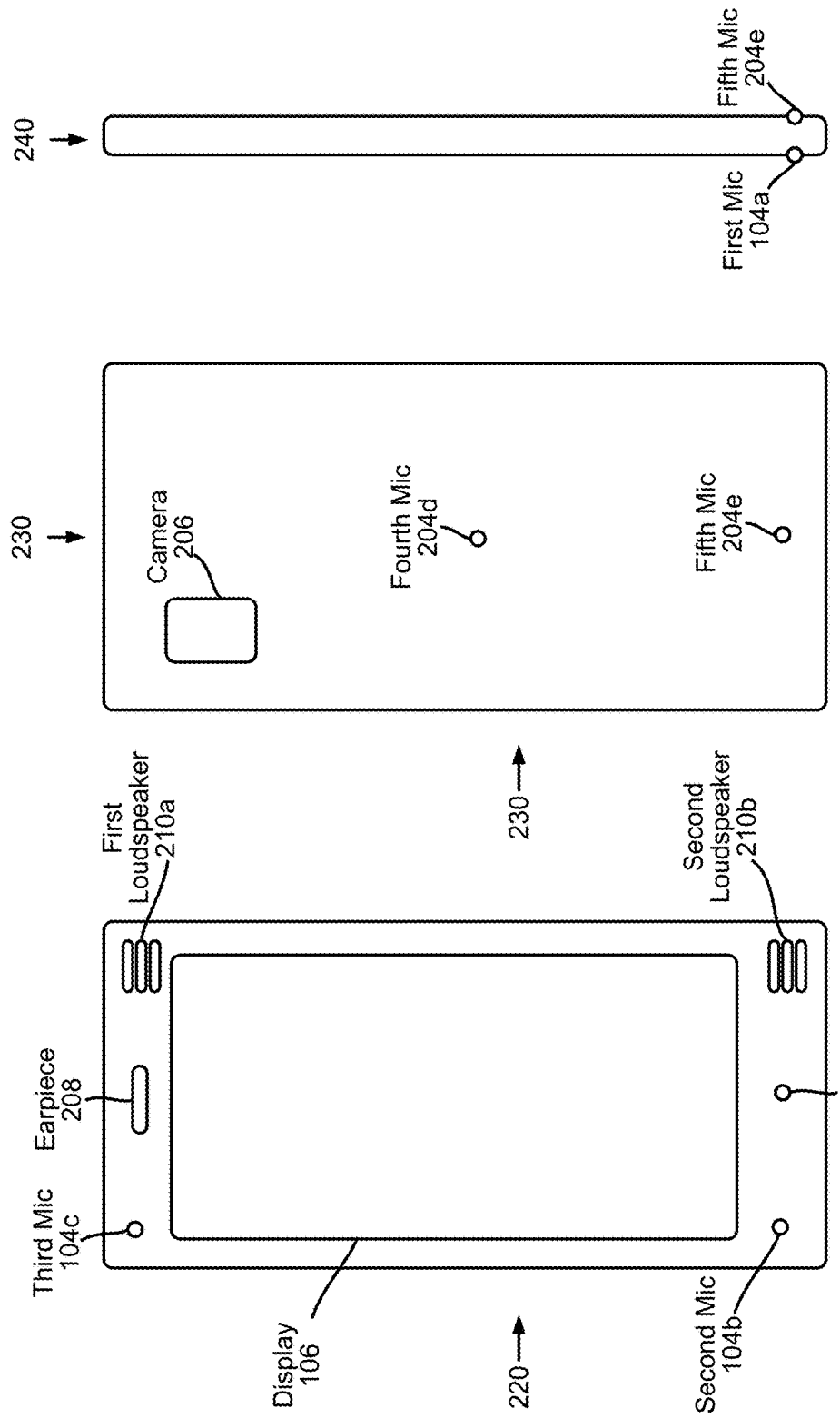

SINGLE CHANNEL OR MULTI-CHANNEL AUDIO CONTROL INTERFACE

RELATED CASES

This application claims the benefit of U.S. Provisional Application No. 62/020,928 filed on Jul. 3, 2014, which is hereby incorporated by reference in its entirety.

TECHNICAL FIELD

This disclosure generally relates to single- or multi-channel audio generation, and more particularly, to techniques for recording audio with a computing device.

BACKGROUND

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities. For example, a computing device, such as a wireless telephone, may include one or more microphones to capture audio signals for storage and playback. As another example, a computing device may record multiple channels of audio simultaneously in real-time. A user of the computing device may select when to start capturing the audio signal and when to stop capturing the audio signal.

SUMMARY

Mobile computing devices, such as smartphones, tablets, laptops, "phablets," convertibles, and wearable computing devices are increasingly incorporating the ability to record multiple channels of audio in real-time. These mobile computing devices may include a microphone array that enables the analog capture of a plurality of different audio channels. This disclosure generally relates to techniques for recording real-time, single- or multi-channel audio using a mobile computing device. This disclosure also generally relates to techniques for providing feedback to a user regarding audio during playback or in real-time as the audio is being recorded. By providing real-time feedback or feedback during playback, a user's experience may be enhanced, the quality of the playback may be enhanced, or the quality of the captured audio may be enhanced. For example, this disclosure describes techniques for enabling users of mobile computing devices to adjust parameters associated with audio channels in real-time.

In one example, a method may include receiving, by a computing device, a plurality of real-time audio signals outputted by a plurality of microphones communicatively coupled to the computing device. The method may include outputting, to a display, a graphical user interface (GUI) for presenting audio information associated with the received audio signals, processing one or more of the received audio signals based on a user input associated with the audio information presented via the GUI to generate one or more processed audio signals, and outputting the one or more processed audio signals.

In another example, a method may include receiving, by a computing device, a plurality of real-time audio signals outputted by a plurality of microphones communicatively coupled to the computing device. The method may include outputting, to a display, a graphical user interface (GUI) for presenting noise information associated with one or more of the received audio signals. The method may include processing one or more of the received audio signals based on a user input associated with the noise information presented via the GUI to generate one or more processed audio signals, and outputting the one or more processed audio signals.

In another example, an apparatus may include a memory, and one or more processors configured to receive a plurality of real-time audio signals outputted by a plurality of microphones, and generate audio information associated with the received audio signals for storage in the memory. The one or more processors may be configured to output, for display, graphical content of a graphical user interface (GUI) for presenting the audio information associated with the received audio signals, process one or more of the received audio signals based on a user input associated with the audio information presented via the GUI to generate one or more processed audio signals, and output the one or more processed audio signals.

In another example, an apparatus may include a memory, and one or more processors configured to receive a plurality of real-time audio signals outputted by a plurality of microphones, and generate noise information associated with the received audio signals for storage in the memory. The one or more processors may be configured to output, for display, graphical content of a graphical user interface (GUI) for presenting the noise information associated with one or more of the received audio signals, process one or more of the received audio signals based on a user input associated with the noise information presented via the GUI to generate one or more processed audio signals, and output the one or more processed audio signals.

In another example, a device may include means for receiving a plurality of real-time audio signals outputted by a plurality of microphones communicatively coupled to the computing device, means for outputting a graphical user interface (GUI) that presents audio information associated with the received audio signals, means for processing one or more of the received audio signals based on a user input associated with the audio information presented via the GUI to generate one or more processed audio signals, and means for outputting the one or more processed audio signals.

In another example, a device may include means for receiving a plurality of real-time audio signals outputted by a plurality of microphones communicatively coupled to the computing device, means for outputting a graphical user interface (GUI) that presents noise information associated with one or more of the received audio signals, means for processing one or more of the received audio signals based on a user input associated with the noise information presented via the GUI to generate one or more processed audio signals, and means for outputting the one or more processed audio signals.

In another example, a non-transitory computer-readable storage medium having instructions stored thereon that, when executed, may cause one or more processors of a computing device to receive a plurality of real-time audio signals outputted by a plurality of microphones, output, to a display, graphical content of a graphical user interface (GUI)

for the display to present noise information associated with one or more of the received audio signals, process one or more of the received audio signals based on a user input associated with the noise information presented via the GUI to generate one or more processed audio signals, and output the one or more processed audio signals.

In another example, a non-transitory computer-readable storage medium having instructions stored thereon that, when executed, may cause one or more processors of a computing device to receive a plurality of real-time audio signals outputted by a plurality of microphones, output, to a display, graphical content of a graphical user interface (GUI) for the display to present audio information associated with the received audio signals, process one or more of the received audio signals based on a user input associated with the audio information presented via the GUI to generate one or more processed audio signals, and output the one or more processed audio signals.

The details of one or more examples are set forth in the accompanying drawings and the description below. Other features, objects, and advantages of the disclosure will be apparent from the description, drawings, and claims.

BRIEF DESCRIPTION OF THE DRAWINGS

FIGS. 2A-C is a diagram, when viewed together, of an example of multiple views of a device for performing multi-channel audio generation;

DETAILED DESCRIPTION

Figure 1:
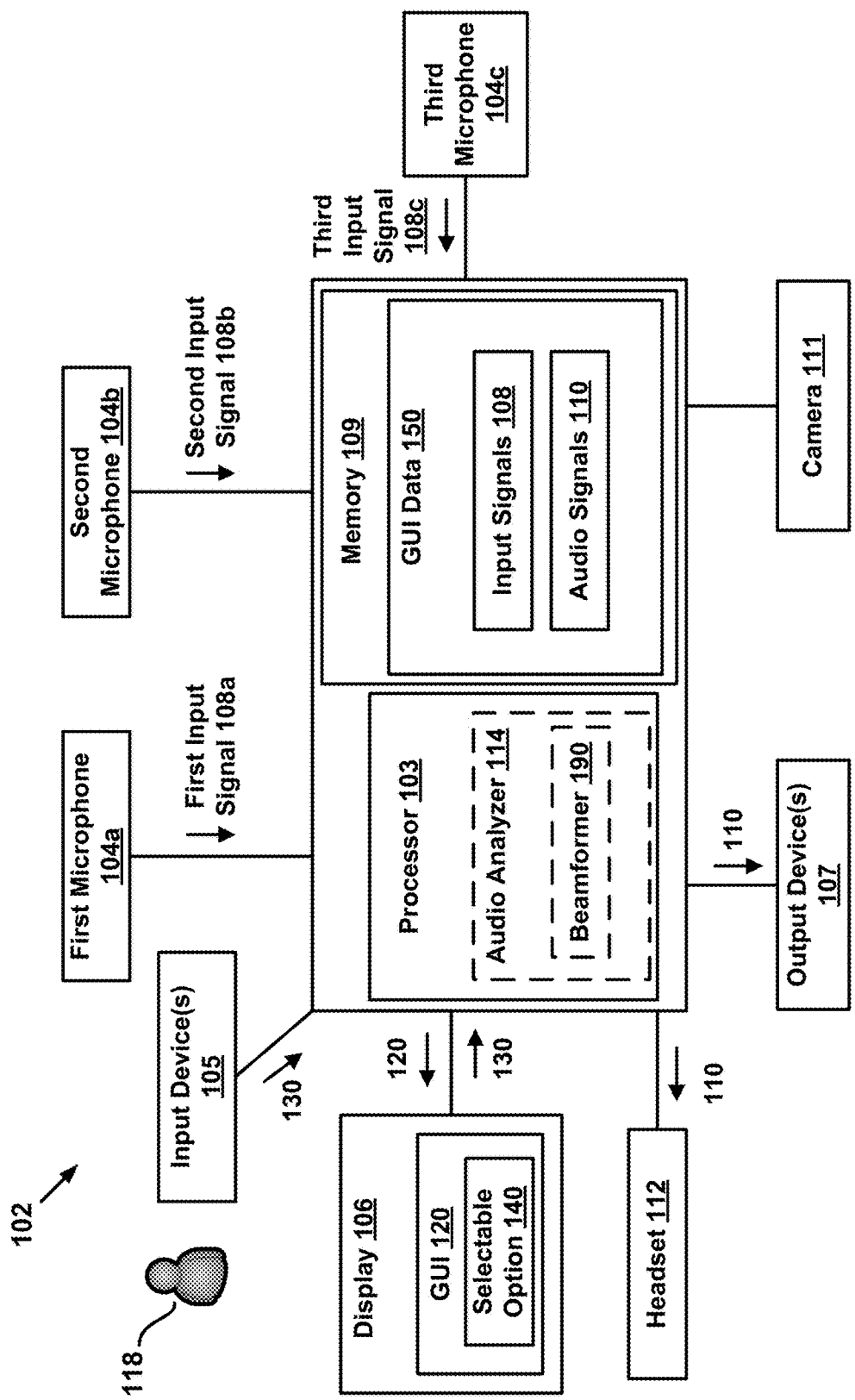
FIG. 1 is a diagram of a computing environment in accordance with one or more techniques of this disclosure.

This disclosure describes various examples of a computing device (e.g., communication devices and other devices) configured to record single- or multi-channel audio in real-time, and to adjust parameters associated with the multi-channel audio in real-time or during playback. Currently, many computing devices, such as laptops, smartphones, phablets, wearable computing devices, tablets, are capable of recording single- or multi-channel audio. Recording multi-channel audio may also be referred to as surround sound recording, which may be accomplished, for example, using advanced audio coding (AAC) or other codec. Surround sound recording may have a number of different channel configurations and format, such as 5.1, 7.1, and 9.1 channel audio formats or other surround sound audio recording formats. These computing devices may also be capable of surround sound audio playback (e.g., real-time playback or non-real-time playback) of recorded surround sound audio. The playback may involve the use of an output interface (e.g. using Bluetooth, HDMI (High Definition Media Interface), or another output interface) to transmit audio information to output devices, such as speakers.

To perform surround sound recording (SSR or multi-channel recording), a computing device may use a plurality of physical microphones. The plurality of microphones may be referred to as a "microphone array." Each microphone may record audio signals for one or more channels of audio. For example, one microphone may record sound for a center audio channel, and another microphone may record sound a left audio channel.

However, conventional SSR systems and SSR-capable devices do not provide feedback to a user of the device in real-time during recording or during playback. SSR-capable devices also do not allow user input in real-time during recording to effectuate changes to the recording in real-time. In some examples, one or more techniques of this disclosure enable a device (e.g., an SSR-capable device) to receive user input in real-time while recording audio with one or more microphones (e.g., while performing SSR). In other examples, one or more techniques of this disclosure enable a device (e.g., an SSR-capable device) to receive user input during playback of previously recorded audio. In other examples, one or more techniques of this disclosure enable a device (e.g., an SSR-capable device) to receive user input in real-time while recording audio with one or more microphones (e.g., while performing SSR) and subsequently store the resultant real-time audio as modified or not modified for later playback in addition to or in lieu of presenting the resultant real-time video.

In some examples, one or more techniques of this disclosure enable a computing device (e.g., an SSR-capable device) to output information to a user via a graphical user interface (GUI) presented on a display of the device in real-time while recording audio with one or more microphones or during playback of previously recorded audio. For example, the device may display the GUI in response to receiving a user input requesting activation of a multimedia application. The information presented to the user via GUI (or by GUI or through GUI, for example) may relate to, among other things, any facet of audio recordation or playback. For example, the information may be audio-related feedback. The GUI may include information concerning or otherwise related to any microphone, any output device, any channel, any audio-signal output by a microphone, and any processing of recorded audio. The GUI may include one or more graphical representations so a user may visualize audio information relating to the recordation audio on a display. The audio-related feedback may inform the user of various aspects relating to the recording, real-time playback, or playback of previously recorded content). The user, or the device when configured as such, may make a determination based on the audio information to alter, modify, otherwise change the audio during playback (whether real-time or not).

The term "channel" is used at times to indicate a signal path and at other times to indicate a signal carried by such a path, according to the particular context.

References to "audio signal" may, depending on the context, mean different things. For example, an audio signal received, transduced, or otherwise captured by a microphone may be considered an audio signal or, more specifically, one or more sound waves. As another example, an output of a microphone may be an audio signal representative of sound, such as a received sound wave or combination of sound waves. An analog signal output by a microphone may, depending on the complexity of the microphone, may be an analog or digital representation of a received sound wave or combination of sound waves. The analog or digital representation may be analog or digital signal such that an audio signal output by a microphone may be in the form of an analog or digital signal. For example, a microphone may be configured to receive an audio signal in the form of one or more sound waves and output an audio signal in the analog or digital domain.

As disclosed throughout this disclosure, real-time audio is to be distinguished from playback of previously recorded audio. Real-time audio or playback, depending on the context, may refer to the recording of audio or the real-time presentment of the audio recorded in real-time. Playback, depending on the context, may refer to audio that was previously recorded in real-time but saved or otherwise stored in memory for later playback. It is understood that recording audio using one or more microphones may result in the device using temporary memory space (e.g., buffer space), permanent memory space (e.g., hard drive space), or a combination thereof accessible to one or more processors of a device to provide real-time presentment of recorded audio. In some examples, as audio is being recorded, the audio may be processed by the device for immediate or relatively immediate output to one or more speakers. While memory space of the device may be used for various processing of the recorded audio, processing delays are not intended to mean that there is not real-time presentment of recorded audio, as opposed to playback. In some examples, the term "recorded" and variations thereof may mean "transduced" or otherwise "captured" along with their respective variations. In other examples, the term "recorded" and variations thereof may mean "transduced" or otherwise "captured" and variations thereof; and that the "recorded" audio is stored in memory space for later playback despite possibly being processed for real-time presentment as well. In other words, real-time presentment of recorded video is meant to refer to techniques being applied as the audio is being recorded. Playback, depending on the context, refers to the case where the audio has already been recorded, and generally well before playback.

References to a "location" of a microphone of a multi-microphone audio sensing device indicate a location of a center of an acoustically sensitive face of the microphone, unless otherwise indicated by the context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband).

In some examples, one or more techniques of this disclosure equally apply to single-channel audio. For example, examples including multi-channel may equally apply to single-channel depending on the context. Accordingly, while the term single-channel may not appear throughout this disclosure, one or more techniques described herein may be implemented in examples involving single-channel audio, such as when a device has one microphone or when a multi-channel signal is down-mixed to a single channel.

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" may be used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

Referring to FIG. 1, one example of a device that is operable to perform single- or multi-channel audio generation is disclosed and generally designated as 102. In other examples, device 102 may have more or fewer components than illustrated in FIG. 1.

Device 102 includes one or more processors 103 and a data storage medium 109 (e.g., temporary or permanent memory space) accessible by one or more processors 103. The one or more processors 103 of device 102 are configured to execute instructions to perform corresponding processes. Accordingly, as used herein, when a process is executed or otherwise performed, that refers to executing one or more instructions or operations corresponding to that process by one or more processors 103 of device 102 (or other processors of other devices in other examples). For example, device 102 may include an operating system. In some examples, the operating system may be a typical operating system, such as a graphical operating system, found on a personal computing device such as a laptop computer, desktop computer, tablet computer, smart phone, or the like. The operating system may be stored on data storage medium 109.

Examples of one or more processors 103 may include, but are not limited to, a central processing unit (CPU), a graphics processing unit (GPU), a digital signal processor (DSP), general purpose microprocessor, application specific integrated circuit (ASIC), field programmable logic array (FPGA), or other equivalent integrated or discrete logic circuitry. The one or more processors 103 may include one or more of these examples and other types of processors in any combination. The one or more processors 103 may be single-core or multi-core.

Examples of data storage medium 109 may include, but are not limited to, one or more computer-readable storage media such as, but are not limited to, a random access memory (RAM), a read only memory (ROM), an electrically erasable programmable read-only memory (EEPROM), flash memory, or any other medium that can be used to carry or store desired program code in the form of instructions and/or data structures and that can be accessed by a computer or a processor. Data storage medium 109 may, in some examples, be considered as a non-transitory storage medium. The term "non-transitory" may indicate that the storage medium is not embodied in a carrier wave or a propagated signal. However, the term "non-transitory" should not be interpreted to mean that data storage medium 109 is non-movable. The data storage medium 109 may include one or more of these examples and other types of data storage mediums in any combination.

Device 102 may include, or be coupled to, one or more input devices 105. Input devices 105 may include a keyboard, mouse, touchscreen display, or other input device.

While depicted separately from one or more input devices 105, it is understood that display 106 constitutes an input device in examples where display 106 is a touchscreen display. Similarly, while depicted separately from one or more input devices 105, it is understood that one or more microphones 104 constitute input devices.

Device 102 may include, or be coupled to, one or more audio output devices 107. One or more audio output devices 107 may include one or more speakers. While depicted separately from one or more output devices 107, it is understood that headset 112 constitutes an audio output device.

Device 102 may include, or be coupled to, a plurality of microphones (e.g., a multi-microphone array). For example, the multi-microphone array may include a first microphone 104a, a second microphone 104b, and a third microphone 104c. Although FIG. 1 illustrates three microphones, device 102 may be coupled to more or less than three microphones in other examples. A plurality of microphones may be used to support spatial audio encoding in two or three dimensions. Examples of spatial audio encoding methods that may be supported with a multi-microphone array may include 5.1 surround, 7.1 surround, Dolby Surround, Dolby Pro-Logic, or any other phase-amplitude matrix stereo format; Dolby Digital, DTS or any discrete multi-channel format; and wavefield synthesis. One example of a five-channel encoding includes Front-Left, Front-Right, Center, Back-Left, and Back-Right channels.

Device 102 may include, or be coupled to, a display 106, a headset 112, or both. Device 102 may include an audio analyzer 114 and a GUI 120. Audio analyzer 114 may comprise software, hardware, firmware, or combinations thereof. Audio analyzer 114 may be stored in data storage medium 109 accessible by one or more processors 103 of device 102. In such examples, any processes associated with audio analyzer 114 may result from execution of one or more instructions associated with audio analyzer 114 loaded from memory 109 for execution by one or more processors 103. As shown in FIG. 1, audio analyzer 114 is surrounded by hashed lines to illustrate that the one or more processors 103 may execute the instructions corresponding to audio analyzer 114 stored in memory 109. In some examples audio analyzer 114 may be an application that when executed by one or more processors 103 of device 102 may generate GUI 120, GUI data 150, or both.

GUI 120 is generated for display by the one or more processors 103 of device 102. GUI 120 is communicated to display 106 for presentment thereon. GUI data 150 stored in memory 109 may include executable instructions that when executed may generate GUI 120 for presentment by display 106. GUI data 150 may be part of audio analyzer 114. In examples where audio analyzer 114 is an application, GUI data 150 may be part of the application, and as such, the corresponding graphical data to audio analyzer 114. In some examples, audio analyzer 114 may be an application that when executed by one or more processors 103 may result in generating, accessing, or executing GUI data 150. For example, according to some examples, the audio analyzer 114 may, upon execution, generate a graphical user interface (GUI) 120 using graphical data 150. As another example, audio analyzer 114 may cause device 102 to render a user interface, such as GUI 120. Audio analyzer 114 may provide GUI 120 to display 106.

GUI data 150 may include data relating to one or more input signals 108, one or more audio signals 110, or a combination thereof. As identified above, audio analyzer 114 may store the GUI data 150 in a memory coupled to, or included in, the device 102. In a particular example, audio signals 110 may be compressed and may occupy less memory than input signals 108.

GUI 120 may include one or more graphical representations so a user may visualize audio information relating to the recordation of audio on a display. The audio-related feedback may inform the user of various aspects relating to the recording, real-time playback, or playback of previously recorded content). The user, or the device when configured as such, may make a determination based on the audio information to alter, modify, otherwise change the audio during playback (whether real-time or not). For example, the user or device may adjust audio parameters, apply filters, and more in real-time while recording audio or during playback, which may improve the quality of recorded audio (e.g., surround sound audio). As another example, audio-related feedback presented to a user via the device may enable a user to select an appropriate option to alter or otherwise adjust the quality of recorded audio, whether in real-time or during playback. For example, a user may interact with GUI 120 based on audio feedback information presented to the user to adjust audio channel volume levels or other properties/parameters of audio in real-time while audio is being recorded or during playback.

In some examples, GUI 120 may include one or more graphical representations (e.g., microphone icons) corresponding to the microphones 104 recording audio for device 102. GUI 120 may include one or more graphical representations (e.g., speaker icons) corresponding to audio output devices used for outputting recorded audio. In some examples, GUI 120 may include three graphical audio channel representations (e.g., three speaker icons), one for each of microphones 104a, 104b, and 104c, because audio analyzer 114 may automatically configure the number of surround sound channels based on the number of microphones. In other examples, three speaker icons may be displayed because a user selected a three-channel surround set up option from a plurality of options using GUI 120. Other examples of audio information that GUI 120 may include are provided throughout this disclosure since any audio information disclosed herein may be included by GUI 120.

During operation of device 102, audio analyzer 114 may receive a plurality of input signals (e.g., input signals 108a, 108b, and 108c) from a plurality of microphones (e.g., microphones 104a, 104b, and 104c). For example, audio analyzer 114 may receive a input signal 108a from microphone 104a, second input signal 108b from microphone 104b, and third input signal 108c from microphone 104c. Input signals 108 may correspond to one or more sound sources. Each of microphones 104a, 104b, and 104c may transduce received sound waves into an analog or digital audio signal. In such examples, each of the first input signals 108a, 108b, and 108c may be considered an audio signal, whether analog or digital.

User 118 may interact with device 102 via the presented GUI 120 and user input devices 105, such as the display 106 in examples where the display is a touchscreen. For example, GUI 120 may include one or more selectable options depicted as 140. User 118 may select at least one of the selectable options 140 and the audio analyzer 114 may generate the audio signals 110 from the input signals 108 based on the selection. For example, the selectable option 140 may include any graphical representation associated with any feature or process associated with, among other things, audio analyzer 114, microphones 104, output devices 107, input signals 108, audio signals 110, other audio-related information, etc.

In some examples, audio analyzer 114 may be referred to as an audio generation application because the audio analyzer 114 may output processed signals (i.e., signals on which audio analyzer conducted processing). In other examples, audio analyzer 114 may not only generate audio as described herein, but may also control when audio is stored, if at all, in memory 109 using device 102. In such examples, audio analyzer 114 may also be referred to as an audio storage application. For example, audio analyzer 114 may store input signals 108a, 108b, and 108c as received from microphones 104a, 104b, and 104c, respectively. As another example, audio analyzer 114 may not store input signals 108a, 108b, and 108c as received from microphones 104a, 104b, and 104c. Instead audio analyzer 114 may store audio signals 110 (i.e., signals output by audio analyzer 114, whether modified or not). In yet another example, audio analyzer 114 may store input signals 108a, 108b, and 108c as received from microphones 104a, 104b, and 104c; and audio analyzer 114 may also store audio signals 110. Stored signals, whether inputs signals 108 or audio signals 110, may be used for playback. In such examples, audio analyzer may or may not receive the stored signals during playback. In examples involving audio analyzer 114 receiving stored signals, audio analyzer 114 may process the stored signals in the same way as real-time signals, such as input signals 108.

User 118 may select a selectable option 140 using any input devices of device 102 (including, for example, display 106). For example, audio analyzer 114 may receive a selection 130 (or otherwise termed input data 130 representative of a selection) from an input device. In one example, audio analyzer 114 may output audio signals 110 to an audio output device 107, such as headset 112 or one or more speakers. The number of channels corresponding to an output device (e.g., two channels for a stereo headset: Left and Right) may be the same as, less than, or more than the number of microphones 104 device 102 received input from to generate audio signals 110. User 118 may use any output device capable of playing audio signals 110 (or a subset of signals contained therein when audio signals 110 includes signals for multiple channels), such as headset 112 or speakers to monitor or listen to the audio signals 110. For example, user 118 may detect a stationary noise level of the audio signals 110 and may use GUI 120 to select a noise suppression (attenuation) option (e.g., selectable option 140) to reduce the stationary noise level of subsequently generated audio signals 110. In this example and other examples, an on-the-fly or otherwise dynamic correction or change can be made in real-time to audio signals subsequently received by audio analyzer 114 based on input(s) received from user 118 that were input based on past audio signals 110 output by audio analyzer 114. It is appreciated that past audio signals 110 may have been then current (or real-time) audio signals 110 at the time user 118 provided any input(s) to affect any processing conducted by audio analyzer 114. In this manner, audio analyzer 114 may enable a user to make real-time adjustments to audio as its being received and output for presentation using one or more output devices to change (e.g., by enhancing) the quality based on the preferences of user 118.

In other examples, GUI 120 may enable the user to modify a rule set stored in memory 109 in which device 102, according to the rules, automatically effectuates changes to recorded audio based on the occurrence of a triggering event defined by a rule (e.g., if EVENT, then ACTION). The event in a rule may be a true or false determination on the presence of defined audio information. The action in a rule may be in response to a determination that the event occurred (or did not occur). For example, user 118 may define a rule such that the device may automatically down-mix or up-mix based on the number of in-use microphones and in-use audio output devices. If the numbers are equal, no change need occur. However, if during recording, for example, a five-microphone array is used with a five-speaker surround set up, a rule may be processed such that the device automatically down-mixes the multi-channel audio in the event that one or more speakers become inoperable or are otherwise powered off. Similarly, if during recording, for example, a five-microphone array is used with a five-speaker surround set up, a rule may be processed such that the device automatically up-mixes the multi-channel audio in the event that one or more speakers become operable or are otherwise powered on.

Audio analyzer 114 may generate a plurality of audio signals (e.g., audio signals 110) from the input signals 108 based on receiving the selection 130 of the selectable option 140, as described with reference to FIGS. 6-13. Otherwise stated, audio analyzer 114 may generate modified or unmodified input signals (termed audio signals 110). By default, audio analyzer 114 may output unmodified input signals 108 instead of audio signals 110. Audio analyzer may generate audio signals in accordance with the process corresponding to the selected option represented by input data 130. Modified input signals (i.e., audio signals 110) refers to one or more subsequently received input signals 108 being modified by audio analyzer 114 following reception of input data 130 in accordance with the process corresponding to the input data 130. Modified input signals may refer to the sound data itself being modified (e.g., using a filter or mixing two or more signals 110 associated with two different channels together in a multi-channel signal), or data corresponding to or otherwise associated with the audio signals 110, such as changing channel information so that any signals may be re-routed to a different output device, and the like. For example, a user may move, using GUI 120 and selecting an appropriate option 140, sound being emitted from a Center speaker to another speaker to create null space around the Center speaker. As another example, GUI 120 may enable a user to adjust channel volume levels (e.g., by adjusting channel gain up or down), audio positions, speaker positions, and other recording parameters. After a first modification (e.g., based on reception of one or more user instructions represented by input data 130), one or more modifications may further take place. Each time a selectable option 140 is made that affects audio processing, audio analyzer 114 may adjust the processing of one or more input signals 108 accordingly so that subsequent audio signals 110 are output according to user preferences. It is understood that while FIG. 1 depicts audio signals 110 being output by audio analyzer 114, audio analyzer may be configured to out unmodified input signals 108 for one or more channels and output modified input signals (i.e., audio signals 110) for one or more other channels.

Audio analyzer 114 may process the input signals 108 to generate the audio signals 110. Audio analyzer 114 may generate several different directional channels (e.g., the audio signals 110) from input signals 108, such as to up-mix input signals 108. For example, input signals 108 may correspond to a first number of channels associated with a first number (e.g., three) of microphones (e.g., the microphones 104a-c). The audio signals 110 may correspond to a second number of channels and the second number may be higher than the first number or lower than the first number, the latter of which relating to an example of down-mixing input signals 108 as opposed to up-mixing input signals 108. For example, audio signals 110 may correspond to five channels for a 5.1 surround sound scheme. Audio analyzer 114 may up-mix the input signals 108 to generate audio signals 110, such that each signal (or channel) of audio signals 110 may be played back (i.e., output) using a different speaker of a speaker array having the second number of speakers.

In some examples, audio analyzer 114 may produce filtered (e.g., modified) signals by filtering input signals 108 based on receiving input data 130 representative of a user selection using GUI 120, as described herein. For example, analyzer may process input signals 108 as described with reference to FIGS. 6-13.

Referring to FIGS. 2A-C, an example of multiple views of a device is shown in FIGS. 2A-C. The views may correspond to device 102 shown in FIG. 1.

The views include a front view 220 depicted in FIG. 2A, a rear view 230 depicted in FIG. 2B, and a side view 240 depicted in FIG. 2C. The front view 220 may correspond to a first side of device 102 that includes display 106. The first side may include first microphone 104a, second microphone 104b, third microphone 104c, an earpiece 208, a first loudspeaker 210a, and a second loudspeaker 210b.

The rear view 230 in FIG. 2B may correspond to a second side of device 102 that is opposite to the first side. The second side may include a camera 206, a fourth microphone 204d, and a fifth microphone 204e. The side view 240 in FIG. 2C may correspond to a third side of the device 102 that connects the first side and the second side.

Figure 3A:
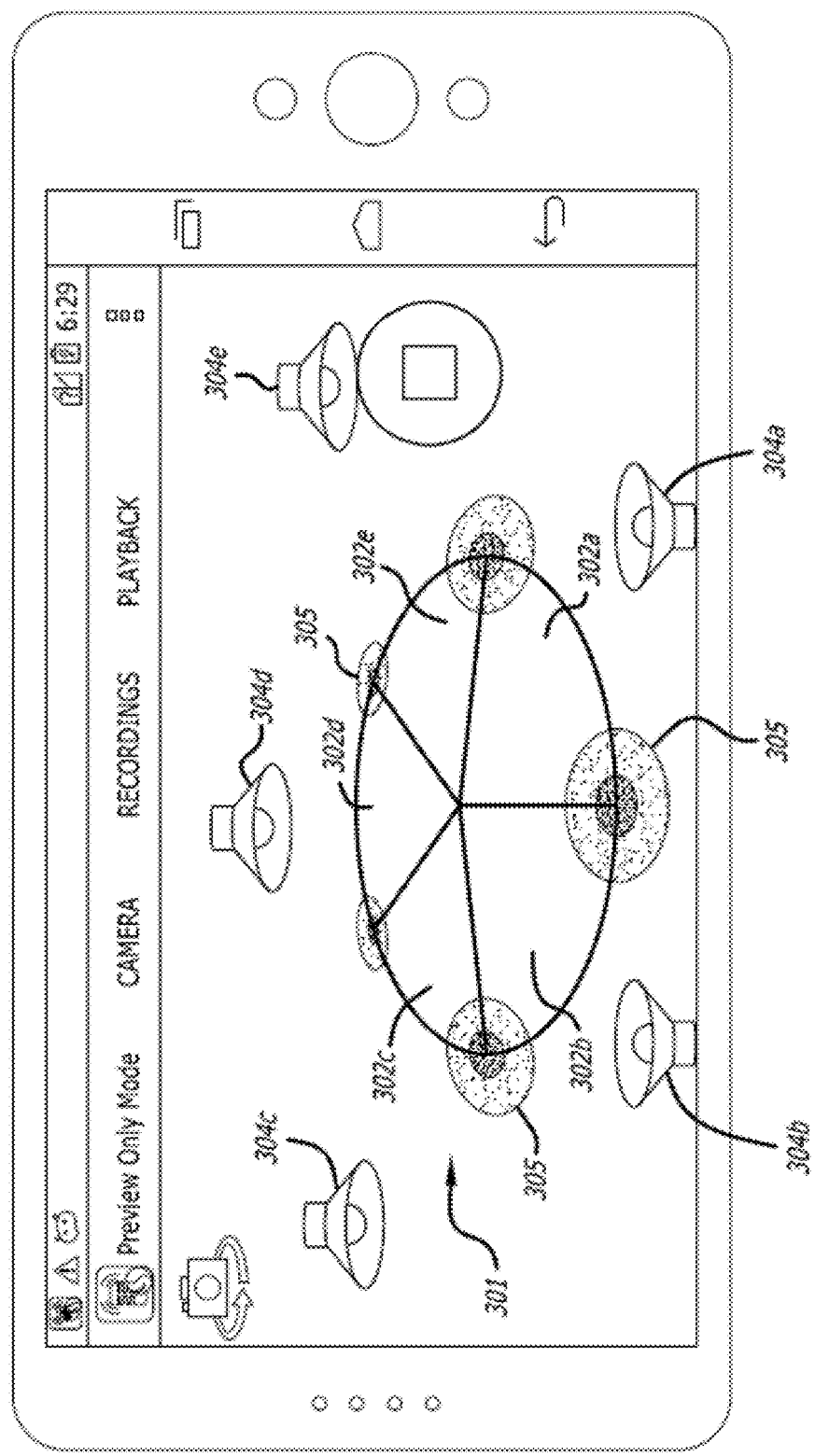
FIGS. 3A-G are various examples of a graphical user interface in accordance with one or more techniques of this disclosure.

FIGS. 3A-G are each an example of GUI 120 of FIG. 1. Referring to FIG. 3A, an example of GUI 120 is shown. In the example shown in FIG. 7, GUI 120 may include a coordinate map 301 and a plurality of selectable options, for example, one or more sectors 302 (e.g., 302a-e), sector re-shapers/re-sizers 305. GUI 120 may also include one or more channel icons (e.g., 304a-e). The channel icons may graphically represent each audio output device 107 configured to audio signals received from audio analyzer 114. A user may select a sector and be presented with one or more options. In other examples, a user may select one or more options and then select the one or more sectors to which the selected option is to be applied. The options may include any processing audio analyzer 114 may be configured to perform.

Each sector 302 of a coordinate map 301, whether in this example or other examples, may correspond to a particular area in a particular direction relative to the device 102 with the center of the coordinate map 301 representing the location of device 102 (or listener location whether virtual or real). Each sector 302 may mutually or exclusively correspond to a particular audio output device 107 in a particular direction relative to device 102 represented by the relationship of each sector to a channel icon. For example, sectors 302a-302e may respectively correspond or otherwise relate to channels 304a-e. Channels 304a-e may respectively relate to Back Right, Back Left, Front Left, Center, and Front Right channels. Sectors 302a-e may respectively relate to input signals 108 associated with microphones 104a-e.

In some examples, audio analyzer 114 may determine direction of arrival information corresponding to input signals 108 and may generate the coordinate map such that each sector 302 showing the presence of sound relates to a microphone in that particular direction. For example, audio analyzer 114 may determine that at least a portion of input signals 108 are received from a particular direction. In the example shown, coordinate map 301 includes five sectors. Coordinate map 301 may correspond to physical coordinates of one or more locations of one or more sources of input signals 108. Coordinate map 301 may indicate a location where the sources of input signals 108 are located relative to device 102. For example, audio analyzer 114 may determine that input signals 108 are not received from a particular direction. A particular sector of coordinate map 301 corresponding to the particular direction may indicate an absence of a source of input signals 108 (e.g., because there is no sound corresponding to that particular direction). For example, a particular sector may be displayed in the GUI 120 as having a particular color, a particular shading, a particular text, a particular image, etc. which may indicate the absence of or the presence of a source of the input signals 108 in the particular direction, whether input signal(s) are being received for the particular sector, the volume level corresponding any speaker(s) associated with the particular sector, the saturation level of any microphone associated with the particular sector, and any other audio information. As another example, audio analyzer 114 may determine a strength (e.g., volume) of an audio signal. Audio analyzer 114 may indicate the strength of the audio signal by a particular shade of a graphical representation in GUI 120, such as a sector or channel/speaker icon. For example, a darker shade may indicate a higher strength.

In some examples, a count of audio signals 110 may correspond to a count of the plurality of channel icons. A count of audio signals 110 may correspond to a count of the plurality of sectors of coordinate map 301. Each of the plurality of channel icons may be associated with a particular audio signal of the audio signals 110. For example, audio analyzer 114 may generate a particular audio signal corresponding to each of the plurality of channel icons.

In some examples, each channel 304 is not exclusively related with a sector 302. For example, surround sound may be recorded using three microphones, which may mean that coordinate map 301 has three sectors with five channel icons spaced around the three sectors. In this example, the graphical representation may serve to inform a user of how audio analyzer 114 may up-mix to five-channel output. For example, selecting a particular channel icon may result in GUI 120 highlight the sector(s), and therefore the microphone(s) and input signal(s) with which that speaker is associated.

During operation, user 118 may use an input device 105 to select a particular sector of sectors 302a-e. In some examples, user 118 may modify a size or shape of the selected sector by moving one or more sector resizers/reshapers 305.

User 118 may select one or more sectors 302 to disable the capturing or recordation of sounds from any microphone(s) associated with the selected sector while other microphones unrelated to the selected sector continue to capture or record sounds. In examples where sectors of coordinate map 301 have a one-to-one correspondence to an audio channel (e.g., represented by channel icons), disabling a sector may result in disabling the corresponding channel. In examples where two or more sectors of coordinate map 301 share correspondence to an audio channel (e.g., represented by channel icons), disabling a sector may result in affecting a corresponding audio channel without entirely disabling the channel such that noise is no longer processed associated with the disabled sector and therefore not mixed by audio analyzer 114 with sounds associated with an enabled sector also associated with the same channel.

Audio analyzer 114 may in response to receiving selection of a sector, filter one or more input signals 108 based on a sector direction of the selected sector to generate audio signals 110, as described herein. In one example, audio analyzer 114 may filter one or more input signals 108 in response to selection of a sector and in accordance with a processing option selected by a user (e.g., move or relocate a signal, delete or remove a signal, filter a signal, etc). Any filtering, processing, or operations performed on audio signals 108 may considered manipulation of audio signals 108 or any corresponding audio channel. For example, a user may manipulate each audio channel by interacting with GUI 210 by selecting any graphical representation associated with each channel.

Figure 3B:
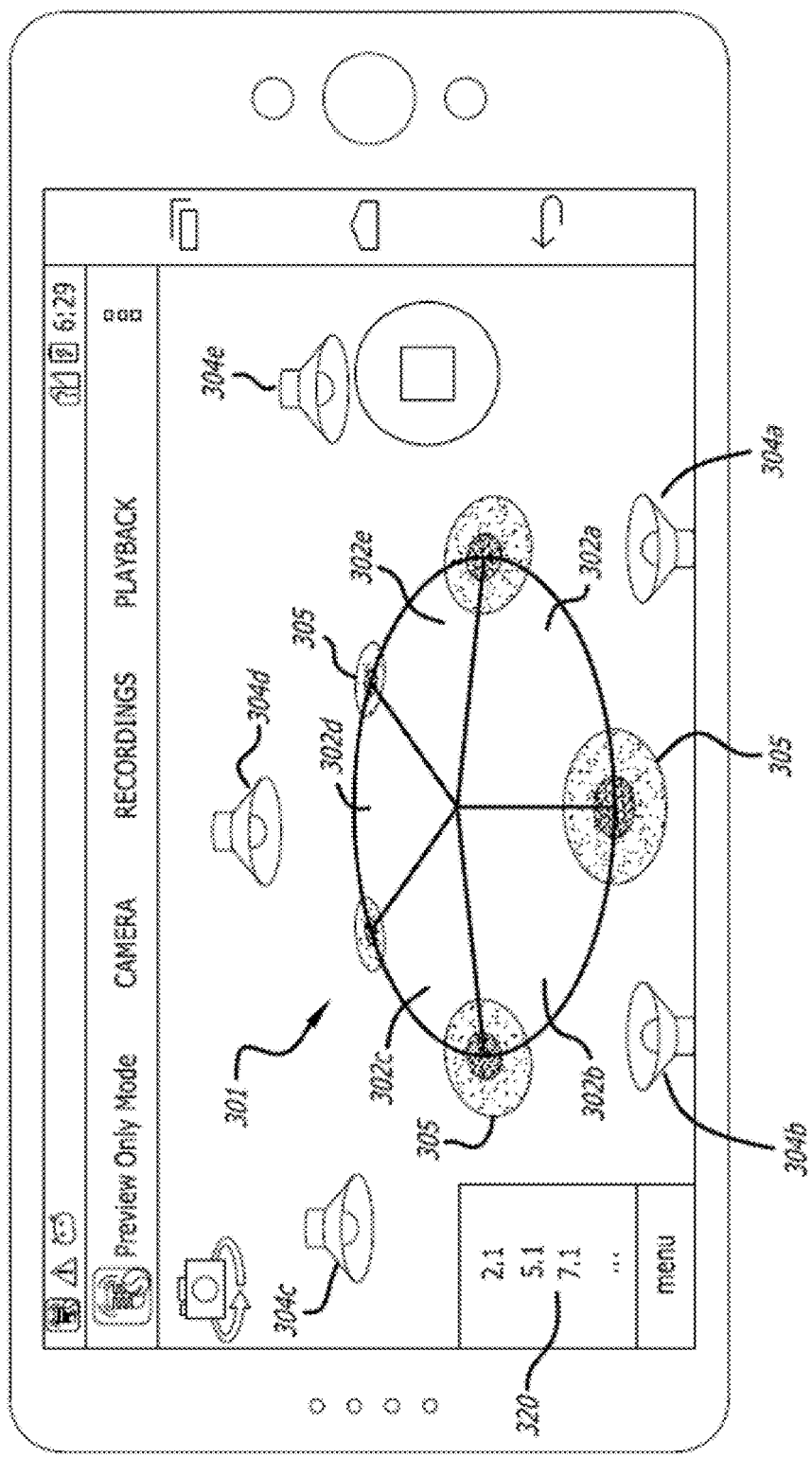

Referring to FIG. 3B, an example of GUI 120 is shown. In this example, an example of a channel configuration menu 320 is depicted. GUI 120 depicted in FIG. 3A may be as a result of user 118 configuring the audio output channels using the channel configuration menu. Channel configuration menu 320 may include a plurality of number of channels options 322 to enable user 118 to specify a number of audio signals 110 to be played back (e.g., generated by audio analyzer 114).

Each option of the number of channels options 322 may indicate a number of audio signals to be generated for a multi-channel signal. For example, a first number of channels option (e.g., 5.1) may indicate that a first number (e.g., 5 plus 1 subwoofer) of audio signals is to be generated, a second number of channels option (e.g., 7.1) may indicate that a second number (e.g., 7 plus 1 subwoofer) of audio signals is to be generated, and so on. Upon selecting the number of channels option 5.1, for example, a graphical representation of 5 output channels (e.g., speakers) may appear around coordinate map 301 in GUI 120. In other examples, any corresponding subwoofer channel may also appear on coordinate map 301 in GUI 120. If the number of channels selected is higher or lower than the number of physical microphones, audio analyzer 114 may up-mix or down-mix the input signals, respectively. For example, audio analyzer 114 may interpolate or generate additional audio channels if the number of channels selected exceeds the number of physical microphones. In response to the user's selection, audio analyzer 114 may determine whether the number of audio output device 107 matches the number of microphones 104; and if not, may warn the user via GUI 120.

In some examples, GUI data 150 of FIG. 1 may store a mapping between each of the number of channels options 322 (e.g., 2.1, 5.1, 7.1, 22.2, or any other channel option) and a corresponding count (e.g., 2, 5, 7, and 22 absent the corresponding subwoofer(s)). Including subwoofers, the corresponding count for such examples may be 3, 6, 8, and 24 respectively. The mapping may include default values. In this example, audio analyzer 114 may use the mapping to determine the count (e.g., 7) corresponding to the particular number of channels option (e.g., 7.1). In a particular example, the mapping may also indicate one or more directions (e.g., left, right, center, left-surround, right-surround, left-back, and right-back) corresponding to each of the number of channels options 322 (e.g., 7). The mapping may also indicate an angle corresponding to each of the one or more directions (e.g., 45 degrees, 135 degrees, 90 degrees, 225 degrees, 315 degrees, 180 degrees, and 0 degrees).

Figure 3C:
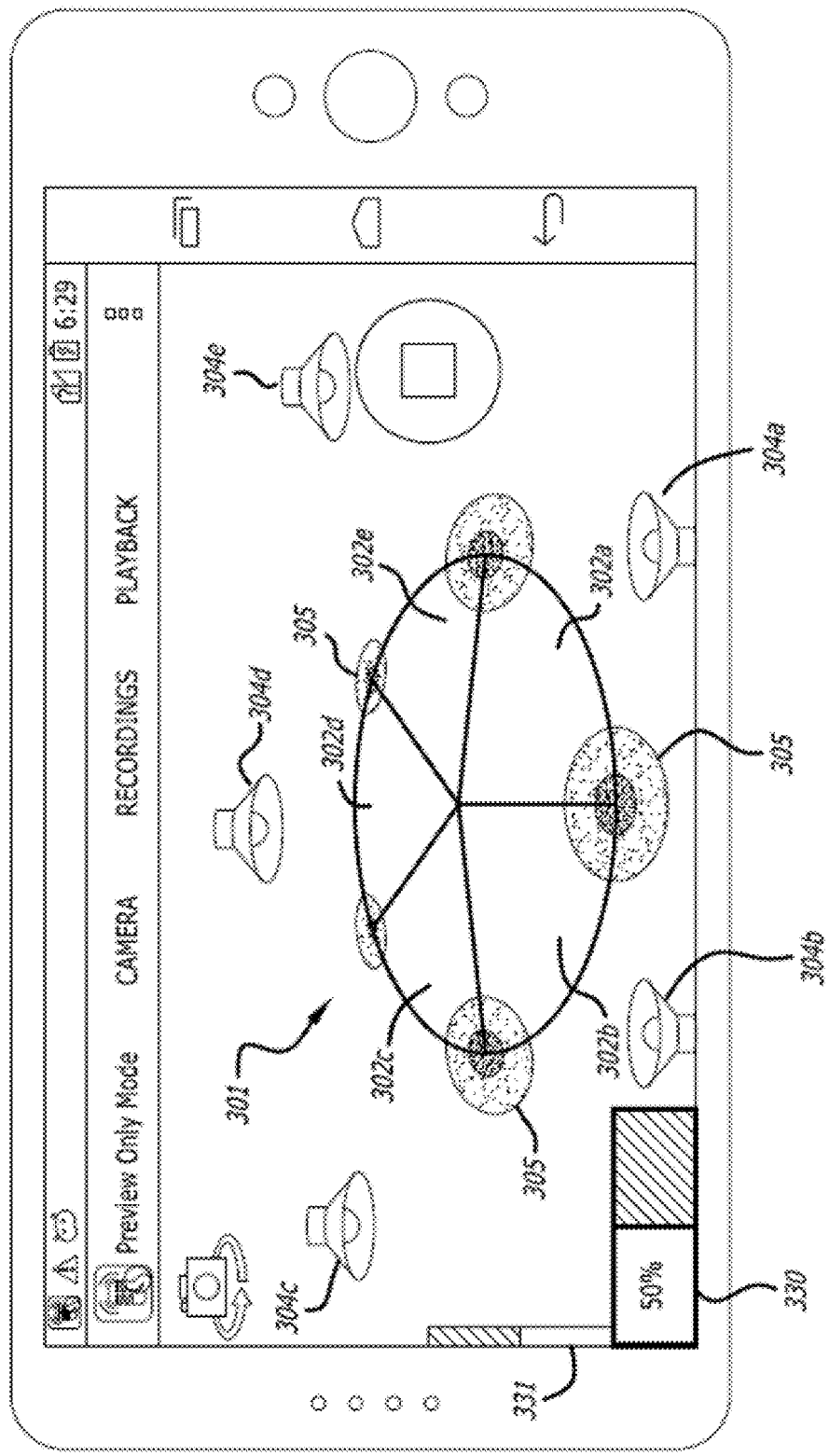

Referring to FIG. 3C, an example of GUI 120 is shown. In this example, an example of a noise suppression (attenuation) option 330 is shown. Noise suppression (attenuation) option 330 may be sector-, channel-, or microphone-specific. Noise suppression option 330 may appear in GUI 120 in response to user 118 selecting one of the sectors 302 or one of the channel/speaker representations 304. Noise suppression (attenuation) option 330 may enable one or more levels of noise suppression (e.g., 0% to 100%). For example, user 118 may use an input device 105 (e.g., including display 106) to select the amount of noise suppression. Audio analyzer 114 may, in response to receiving to the noise suppression option 330 being invoked, generate audio signals 110 by suppressing stationary noise present in input signals 108 based on the level of noise suppression selected. For example, audio analyzer 114 may select a particular noise filter (e.g., stationary noise filter) based on the level of noise suppression and audio analyzer 114 may generate audio signals 110 by applying the particular noise filter to the input signals 108. As used herein, the term suppression may mean attenuation or equivalents thereof.

Noise suppression option 330 may enable a user to cause audio analyzer 114 to generate audio signals 110 corresponding to a selected noise suppression level. Having a user selectable noise suppression level may enable the user to choose whether stationary noise is captured (e.g., a microphone primarily recording noise may be disable depending on the noise suppression selected by user 118), output by audio analyzer 114, or how the stationary noise if filtered. For example, the user may capture sounds of waves at a beach and may reduce sounds of wind captured during a speech.

Noise may be any unwanted sound, such as one or more unwanted sound waves/audio signals at any combination of frequencies. For example, noise may include noise pollution caused by transportation systems and vehicles, the cacophony of city noise, or any unwanted noise in an audio system involving a wanted signal (e.g., signal to be processed and outputted) as compared to an unwanted signal (e.g., signal that is to be rejected or suppressed or otherwise filtered). In one example, the sound of waves at a beach may be considered unwanted noise and filtered out of a recording. In another example, the sound of waves at the beach may not be considered unwanted noise and therefore not filtered out of a recording.

Whether sound constitutes noise may depend on the wanted sound compared to the unwanted sound and their relationship in amplitude and frequency(ies). In some examples, noise may be any sound or audio signal or the like defined by a user. For example, the GUI described herein may enable a user to select one or more sounds (e.g., city sounds, dog barking, etc.) resulting in audio analyzer 114 outputting audio signals 110 such that the audio signals 110 have been filtered to remove or suppress the selected sound (s). In another example, the GUI described herein may enable a user to record one or more sounds (e.g., dog barking, cat meowing, ocean waves, etc.) to define a corresponding filter such that audio analyzer 114 outputs audio signals 110 such that the audio signals 110 have been filtered to remove or suppress the recorded sound(s).

In some examples, the noise suppression option 330 may constitute a "null" out option. In response to the null out option being selected, audio analyzer 114 may suppress audio associated with one or more selected sectors. For example, a user may select a sector to null out. The nulled out region corresponds to a region within the audio channels at which audio analyzer suppresses audio corresponding to that region. In some examples, a user may push-and-drag to re-resize or re-shape one or more sectors to input a null out instruction (i.e., noise suppression/cancellation instruction). In other examples, a user may select a sector and be presented with, among other options, a null out option that when selected causes audio analyzer 114 to suppress audio in accordance with the selected suppression level (or type of filter) for the selected sector to be suppressed, which affects the audio signals 110 and therefore the sound presented to a user via in any associated speaker(s) 107.

In some examples, coordinate map 301 may indicate where a source of stationary noise in the input signals 108 is located relative to device 102. Audio analyzer 114 may determine a stationary noise level associated with the input signals 108. For example, audio analyzer 114 may determine the stationary noise level based on a noisiness metric (e.g., a linear prediction coding (LPC) prediction gain) of input signals 108. In a particular example, a lower LPC prediction gain may indicate a higher stationary noise level of input signals 108. The noisiness metric may be defined in terms of variability of input signals 108 or in terms of power or energy of input signals 108. In a particular example, audio analyzer 114 may determine a particular stationary noise level associated with each of input signals 108 and GUI 120 may indicate the particular stationary noise level in a direction associated with a corresponding microphone. For example, audio analyzer 114 may determine a first stationary noise level of input signal 108a. GUI 120 may then indicate the stationary noise level associated with first microphone 104a. For example, GUI 120 may indicate the stationary noise level on coordinate map 301 in a first direction corresponding to microphone 104a. GUI 120 may thus indicate to user 118 a location where a source of stationary noise is located relative to device 102 enabling user 118 to take actions based on this audio information (i.e., noise information). For example, user 118 may move away from the source of the stationary noise or invoke certain processing options provided by audio analyzer 114.

Audio analyzer 114 may modify (e.g., increase or decrease) a noise reference level based on the level of noise suppression. Audio analyzer 114 may generate audio signals 110 by applying a noise filter to input signals 108 to filter one or more frequency bands of the input signals 108 that have an amplitude that satisfies (e.g., is higher than or is lower than) the noise reference level. The noise reference level may be based on the particular noise filter selected by the user. As "input signals" is used in reference to applying one or more filters thereon, it is understood that audio analyzer 114 may selectively apply the noise filter (or any other filter) to the one or more input signals including the noise. In other examples, audio analyzer 114 may apply the particular noise filter based on or regardless of the relationship between each input signal and sector.

In some examples, audio analyzer 114 may apply frequency domain modification to input signals 108 prior to applying a noise filter (e.g., stationary noise filter) to input signals 108. To illustrate, audio analyzer 114 may generate intermediate signals by applying a particular low-pass filter, a particular high-pass filter, or a particular band-pass filter to input signals 108. Audio analyzer 114 may generate audio signals 110 by applying the particular stationary noise filter to the intermediate signals to filter one or more frequency bands of the intermediate signals that have an amplitude that satisfies (e.g., is higher than or is lower than) the particular noise reference level.

Audio analyzer 114 may provide generated audio signals 110 to headset 112 or other output device 107 such as a speaker. User 118 may use headset 112 to monitor or listen to the generated audio signals 110 and may adjust the level of noise suppression by selecting (e.g., moving) the noise suppression option 330. For example, user 118 may be at a beach and may want to capture sounds of waves. In this example, user 118 may reduce the level of noise suppression by moving the noise suppression option 330 in a first direction (e.g., left). In another example, user 118 may be at an outdoor conference and may want to capture a speech of a particular speaker. The user 118 may listen to the audio signals 110 via the headset 112 and may realize that audio signals 110 have a high level of noise corresponding to the wind touching the microphones 104a-c. In this example, user 118 may increase the level of noise suppression by moving the noise suppression option 330 in a second direction (e.g., right). Alternatively, or in addition, user 118 may move the device 102 to a less windy location based on receiving graphical feedback concerning recorded audio.

Audio analyzer 114 may enable on-the-fly or otherwise dynamic corrections or changes that can be made in real-time to audio signals subsequently received by audio analyzer 114 based on user input data representative of user selections using, for example, the GUI that were input based on past audio signals 110 output by audio analyzer 114. It is appreciated that past audio signals 110 may have been then current (or real-time) audio signals 110 at the time user 118 provided any input(s) to cause audio analyzer 114 to conduct any processing of subsequently received input signals 108. In this manner, audio analyzer 114 may enable a user to make real-time adjustments to audio as its being received. Adjustments are made to subsequently received input signals (or a single input signal) by audio analyzer 114 and output for presentation using one or more output devices 107.

Figure 3D:
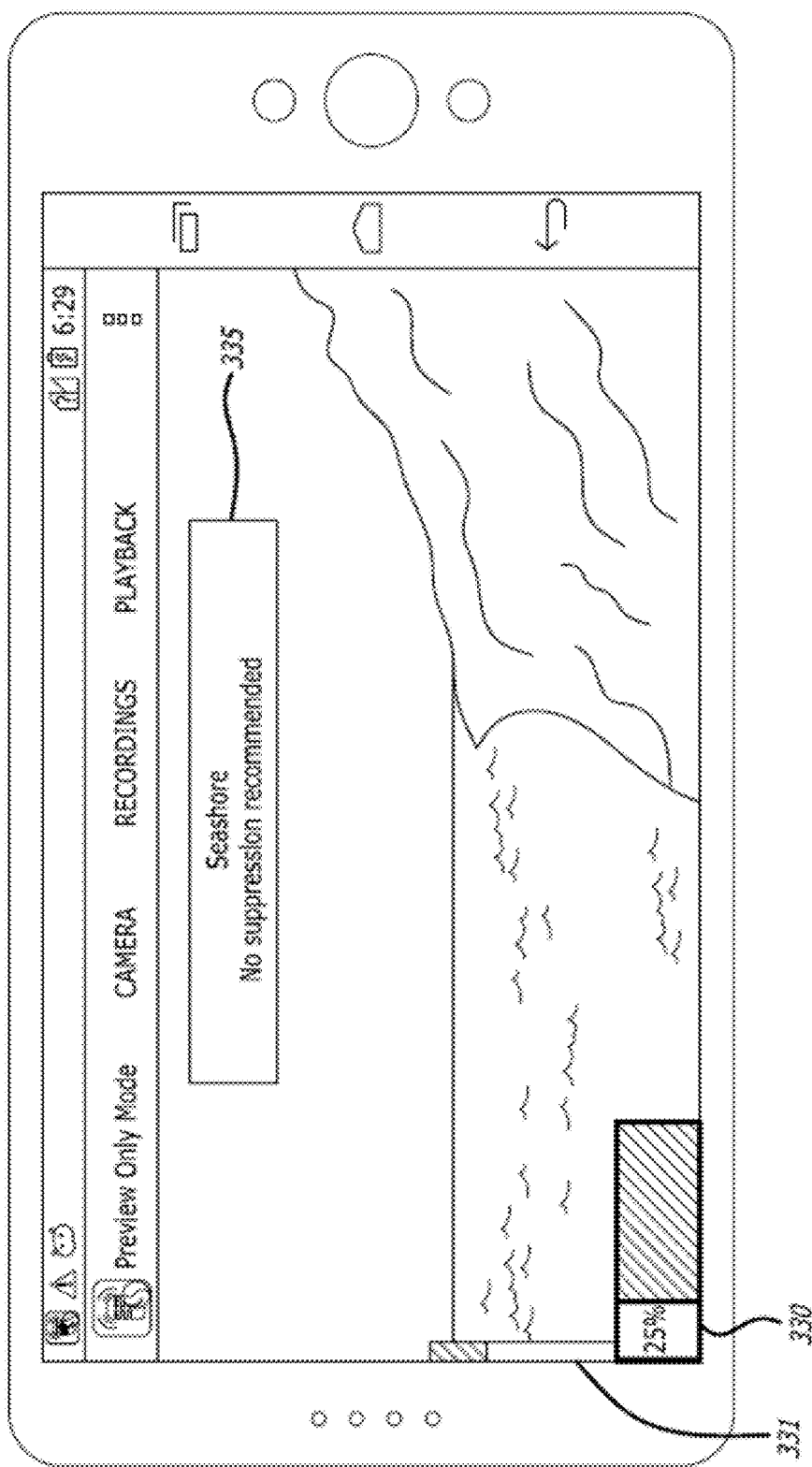

Referring to FIG. 3D, an example of GUI 120 is shown. In this example, another example of noise suppression option 330 is shown. In this example, noise suppression option 330 is complemented by a noise indicator 331, which indicates an amount of stationary noise (e.g., background noise) that audio analyzer 114 detects based on processing input signals 108 corresponding to microphones 104. As indicated above, a user may interact with noise suppression option 330 to indicate an amount of background noise (e.g., stationary noise) that audio analyzer 114 is to suppress in one or more input signals 108. In some examples, GUI 120 includes a noise suppression option 330 and a noise indicator for each microphone 104.

In some examples, to estimate the noise level, which may be represented in the noise indicator 331, audio analyzer 114 may calculate:

SNR=scale*$\sum_{i=1}^{N}$Nref(i)$^2$, where SNR=Stationary Noise Reference, Nref=magnitude spectrum of stationary noise reference, i=Frequency bin (1 to 512 if 512 size FFT is used), and scale=scale factor to be used for GUI representation. Audio analyzer 114 may scale the total energy of this final noise reference and use the final noise as the noise level in GUI, such as the value depicted in noise indicator 331.

In some examples, the noise level may be depicted using a single bar for noise indicator 331 showing a single color (e.g., green for example). In such examples, the higher the green bar relative to its base, the more stationary noise there is; and the lower the green bar relative to its base, the less stationary noise there is. In response to applying noise suppression, the single bar for noise indicator 331 may include a second color (e.g., blue) within the same bar to show the amount of noise suppressed. For example, assume the stationary noise level (or reference) is measured to be at a certain amount. The noise indicator 331 may climb to a first height corresponding to the amount of measured noise. Upon applying noise suppression, the height of the noise indicator 331 would stay the same but the top of the green bar would drop to show that the amount of noise after noise suppression is less than before noise suppression. Above the green bar may be another colored bar (e.g., blue) starting at the top of the green bar and filling the bar to the noise indicator 331 to the top. This blue bar enables the user to quickly understand how much noise was removed.

For example, as shown in FIG. 3B, the depicted white bar may correspond to the "green" bar and the hatched-lined bar may correspond to and the "blue" bar. By checking the delta (i.e., change) between the green and blue bars, a user may notice how much stationary noise is being suppressed. In the green/blue bar example of noise indicator 331, the green bar before suppression may be based on the amount of noise calculated using the equation above.

The green bar after suppression may be based on the amount of noise calculated using the following equation: SNR=scale*$\Sigma_{i=1}^{N}$(NSgain(i)*Nref(i))$^2$, where Nref=magnitude spectrum of stationary noise reference, i=Frequency bin (1 to 512 if 512 size FFT is used), NSgain=gain of stationary noise, and scale=scale factor to be used for GUI representation. In this way, if 25% noise suppression is applied, after suppression, the green bar may reduce in height by 25%. For example, in FIG. 3C, 50% suppression is shown; however, in FIG. 3D, 35% suppression is shown.

In some examples, a camera 111 of device 102 may be used to perform scene or object detection based on, for example, a captured photo and then analyzing the captured image with audio analyzer 114. Based on a detected scene or object, device 102 may, via GUI 120, recommend or not recommend noise suppression to the user. FIG. 3D shows one example of a detected scene or object indication 333 and also noise suppression recommendation 335. In the example shown in FIG. 3D, audio analyzer 114 detects a seashore, the corresponding audio for which has the sound of rolling waves as stationary noise. Audio analyzer 114 may increase the accuracy of scene or object detection by using sounds currently or previously recorded to aid the audio analyzer in determining and identifying a scene or object for a particular image. In the example shown in FIG. 3D, audio analyzer may have determined the scene (or current location of device 102 if processing is being conducted in real-time) was seashore based on a capture image (e.g., a beach), currently recorded sound (e.g., waves), or both. Based on the scene, audio analyzer 114 may recommend against stationary noise suppression, as shown. No suppression may be recommended because ocean waves just like other noises may not be considered noise (e.g., such sounds may be considered to add to the ambiance of recorded audio). In another example, such as an indoor setting with a noisy air conditioner or fan, the scene detection algorithm may recommend stationary noise suppression.

Additionally, as illustrated in FIG. 1, the computing device may be able to use a camera of the computing device to perform scene or object detection. Based on a detected scene or object, the computing device may recommend or not recommend noise suppression to the user. In the example of FIG. 1, the computing device detects a seashore, the corresponding audio for which has the sound of rolling waves as stationary noise. Based on the detected seashore scene, the computing device may recommend against stationary noise suppression. In another example, such as an indoor setting with a noisy air conditioner or fan, the scene detection algorithm may recommend stationary noise suppression.

In some examples, position location may be used to perform scene detection, whether alone or conjunction with other examples of scene detection herein (e.g., analyzing an image). For example, position location may refer to coordinates of device 102 or the coordinates of one or more microphones 104. Device 102 may be a GPS-enabled device with, for example, a GPS receiver configured to calculate or determine a 2D position (e.g., latitude and longitude) or 3D position (e.g., latitude, longitude, and altitude) upon receiving a requisite signal(s) (e.g., one or more satellite signals). One or more microphones 104 may be GPS-enabled with, for example, a GPS receiver configured to calculate or determine a 2D position (e.g., latitude and longitude) or 3D position (e.g., latitude, longitude, and altitude) upon receiving a requisite signal(s) (e.g., one or more satellite signals). Audio analyzer 114 may be configured to receive GPS data (e.g., GPS coordinates) from device 102 or one or more microphones 104.

Audio analyzer 114 may be configured to perform detection based on one or more GPS coordinates of, for example, device 102 or one or more microphones 104. Based on a detected scene, such as device 102 determining its position is on a beach based on one or more GPS coordinates calculated or determined before, during, or after recording audio, audio analyzer 114 may recommend or not recommend stationary noise suppression. As another example, audio analyzer 114 may determine that based on GPS coordinates of device 102, the device is in a car, train, or airplane based on a rate of travel calculated using the GPS coordinates. In such an example, audio analyzer 114 may automatically apply, for example, a road noise filter, railway filter, or air travel filter. Such filters may respectively filter out common unwanted noises associated with such modes of travel such as road noise, railway noise and loud train whistles, and engine noise, respectively. In yet other examples, GUI 120 enables a user to input a location (e.g., address, city, city and state, country, or any other identifying information) to enable audio analyzer 114 to perform scene selection or otherwise enhance (e.g., increase the accuracy) of any scene detection performed by audio analyzer 114.

Figure 3E:
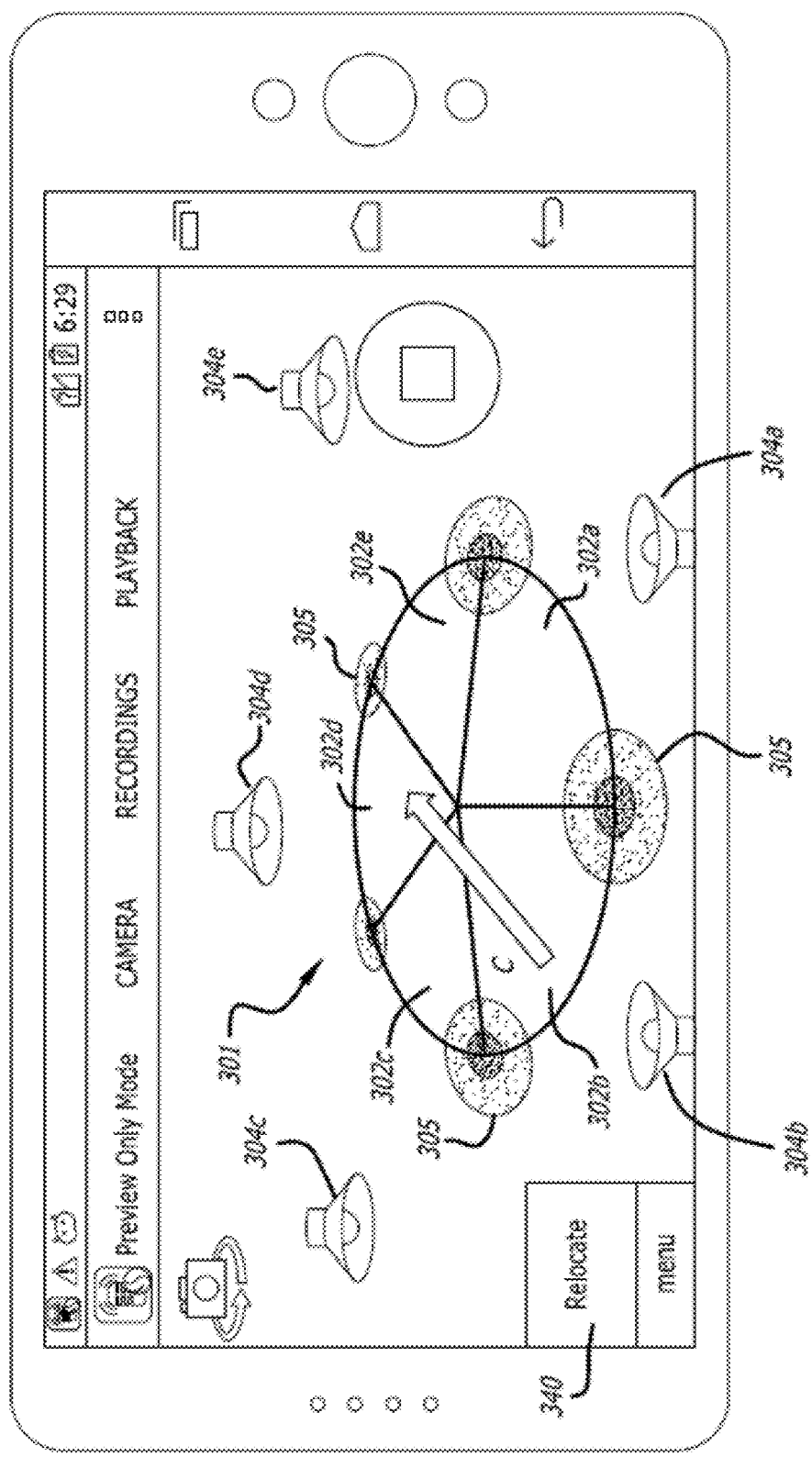

Referring to FIG. 3E, an example of GUI 120 is shown. In this example, an example of a relocation option 340 is shown. During operation, user 118 may select one of the sectors 302. Subsequent to selecting sector 302, GUI 120 may present a relocation option 340 among a list of other selectable options 140. For example, relocation option 340 may be represented in GUI 120 as part of a menu or matrix of virtual buttons. As one example use for relation option 340, user 118 may want to change from which audio output device(s) 107 a commentator's voice is output from. The commentator may be speaking from a particular direction (e.g., behind user 118) relative to device 102. User 118 may want to generate audio signals 110 such that the recorded voice of the commentator corresponds to a particular signal or channel (e.g., a center channel). User 118 may select one or more sectors 302 with which the commentator's voice is associated and in turn select the relocation option 340. Then, user 118 may select a sector or channel icon to which subsequent audio signals 110 corresponding to the commentator's voice will be transferred or relocated. Other examples may involve a different order of operation concerning when audio analyzer 114 is informed that the selections correspond or relate to relocating a signal.

GUI 120 may thus enable a user to generate multi-channel audio signals such that an audio signal corresponding to a particular channel corresponds to input signals received from a particular direction corresponding to a particular sector of a coordinate map. For example, using GUI 120 and relocation option 340, a user may move or relocate audio being output to a first audio output device 107 associated with a first audio channel to a second, different location such that audio from the first audio channel is moved to a second audio output device 107 associated with a second audio channel. As an example, if a commentator's voice originates from a rear channel, a user may use the GUI 120 to push, drag, or otherwise move the commentator's voice from the back channel to the center channel. In some examples, GUI 120 enables a user to move/relocate audio by selecting the sector with which the commentator's voice is associated, and then the next sector selected would cause audio analyzer 114 to transfer audio from the first sector to the second sector effectively moving the audio to the output device 107 associated with the second sector. In other examples, GUI 120 enables a user to move/relocate audio by selecting a graphical representation of an audio channel (e.g., depicted as a channel icon), and then the next graphical representation of another audio channel would cause audio analyzer 114 to transfer audio from the first audio channel to the second audio channel. As such, audio analyzer 114 may move or relocate audio from a first region (e.g., sector or channel) to a second region (e.g., sector or channel). In other examples, movement of audio may include moving audio to a sector or channel while keeping the audio at the origination sector or channel. For example, a commentator's voice may only be associated with the back channel. Using the relocation option 340, the commentator's voice can be moved to also be associated with one or more other channels.

A user may determine that directional noise should be relocated from the region associated with user's selection point "C" in one of the sectors 302 to another region (e.g., one or more other sectors 302). For example, as shown in FIG. 3E, a user may use an upward dragging gesture shown as the arrow from selection point "C" to indicate that the first region should be relocated to the region associated with the center channel. In this manner, GUI 120 may enable a user to selectively mix two or more sectors and any corresponding audio channels.

Figure 3F:
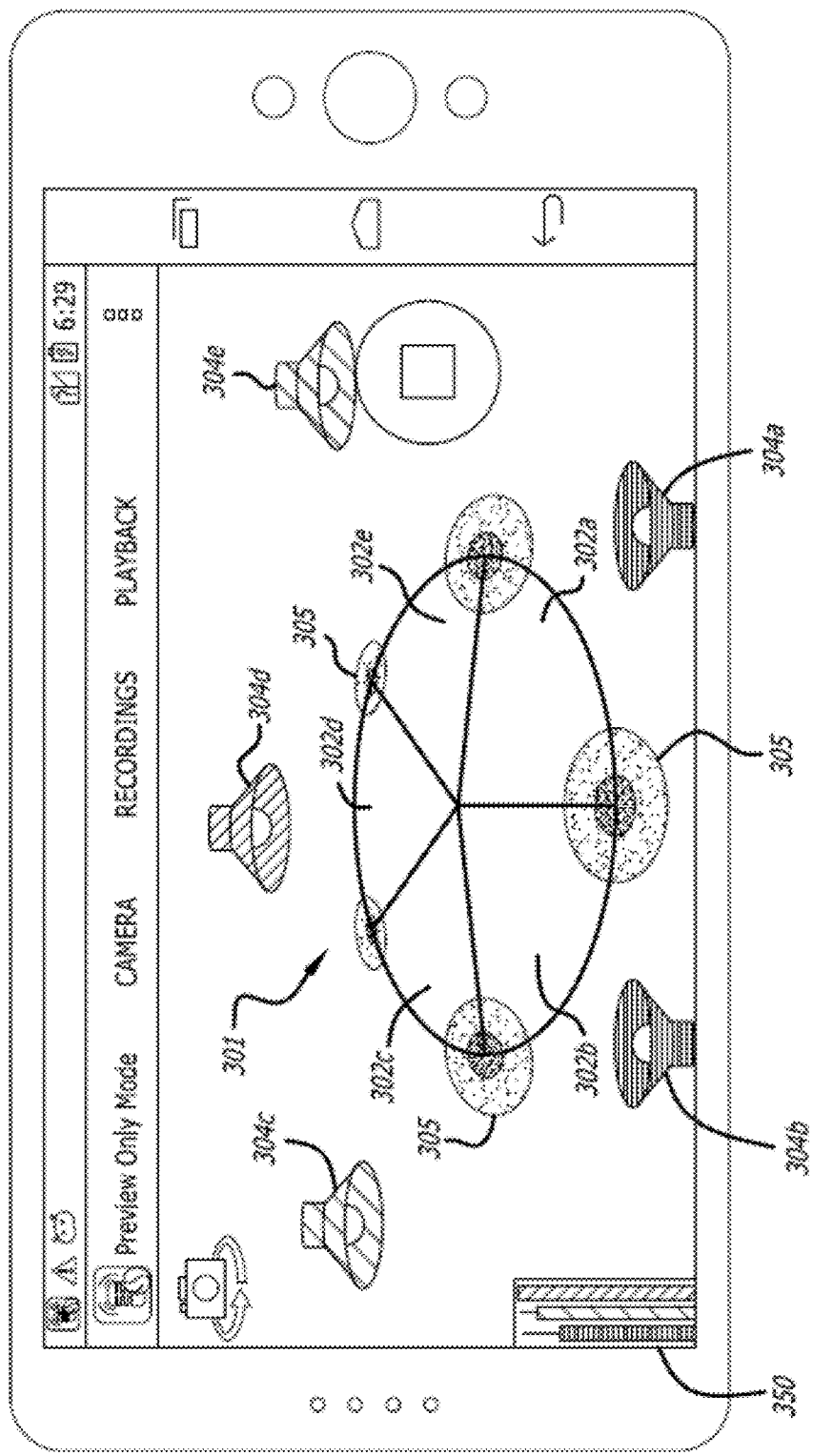
Figure 3G:
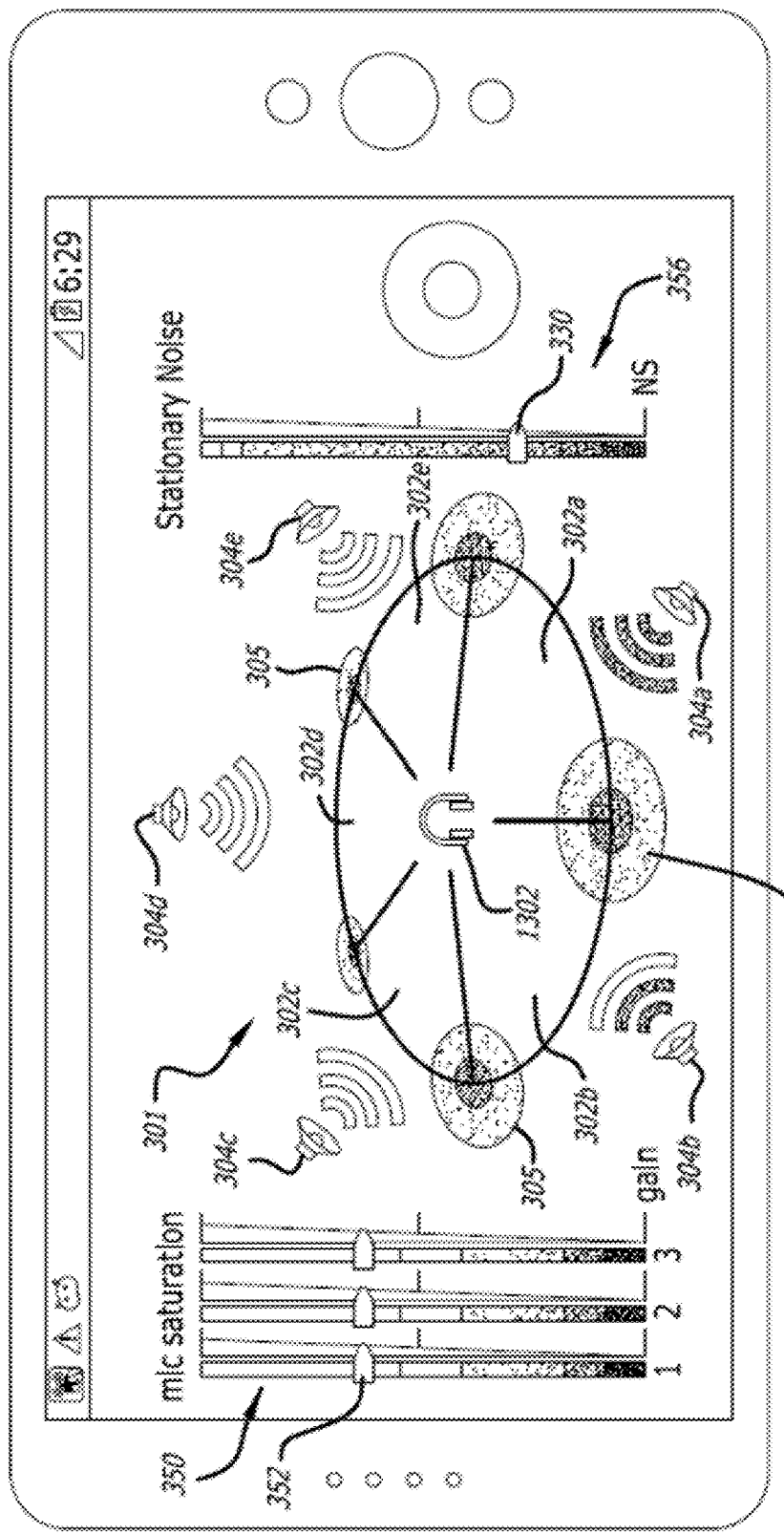

Referring to FIGS. 3F and 3G, two examples of GUI 120 is shown. In this example, an example of audio level (e.g., volume/amplitude level) indicators 350 is shown. FIGS. 3F and 3G are similar but show different levels of detail.

During operation, audio analyzer 114 may determine an output audio level associated with each of the audio signals 110 associated with each channel (for example, in a 5-channel surround setup, audio signals 110 may include five signals, one for each channel). For example, audio analyzer 114 may measure a first output audio level of a first audio signal corresponding to channel/speaker icon 304*a*, a second output audio level of a second audio signal corresponding to channel/speaker icon 304*b*, and so on. Audio analyzer 114 may measure a particular output audio level by applying a particular metric (e.g., root mean square) to amplitude of a sound wave associated with the audio signal 110 corresponding to each of channel/speaker icons 304*a-e*.

GUI 120 may indicate the output audio level associated with each of audio signals 110. In a particular example, a color or other graphical representation of each channel icon (e.g., channel icons 304*a-e*) may indicate a corresponding output audio level (e.g., volume/amplitude level). For example, a first color of channel icon 304*d* may indicate a first output audio level (e.g., volume/amplitude level), a second color of channel icon 304*e* may indicate a second output audio level (e.g., volume level), and so on. In one example, a darker or more intense color (e.g., bright red) may indicate a higher output audio level (e.g., volume/amplitude level) than compared to a lighter or less intense color (e.g., light yellow) which may indicate a lower output audio level (e.g., volume/amplitude level). In some examples, GUI 120 may include a three-dimensional (3D) plot (e.g., a 3D mesh plot) indicating the output audio level associate with each of audio signals 110. In another example, graphical volume bars may be positioned above each channel/speaker icon 304 to indicate the output level associated with each audio signal 110.

Audio analyzer 114 may determine an input audio level (e.g., volume/amplitude level) associated with each of the input signals 108. For example, audio analyzer 114 may determine a first input audio level associated with first input signal 108*a*, a second input audio level associated with second input signal 108*b*, a third input audio level associated with third input signal 108*c*, and so on. Input audio levels are depicted as audio level indicators 350. Audio analyzer 114 may measure a particular input audio level by applying a particular metric (e.g., root mean square) to the amplitude of an input signal associated with a microphone (i.e., the input signal being transduced from one or more sound waves received by the microphone, for example). Audio analyzer 114 may determine that a particular input audio level (e.g., volume/amplitude) is associated with a particular microphone in response to determining that a corresponding input signal is associated with the particular microphone. For example, the first input audio level may be associated with first microphone 104*a*, the second input audio level may be associated with second microphone 104*b*, third input audio level may be associated with the third microphone 104*c*, and so on.

GUI 120 may indicate a noise level associated with each audio channel. In a particular example, a color or other graphical representation of each channel icon (e.g., channel icons 304*a-e*) may indicate a corresponding noise level. For example, a first color of channel icon 304*d* may indicate a first noise level, a second color of channel icon 304*e* may indicate a second noise level, and so on. In one example, a darker or more intense color (e.g., bright red) may indicate a higher noise level than compared to a lighter or less intense color (e.g., light yellow) which may indicate a lower noise level. In some examples, the noise information (e.g., noise levels) is spatially presented by the GUI via a dynamic graphical representation for one or more audio channels. For example, a graphical representation may change based on the amount of noise corresponding to the audio channel with which the graphical representation is associated.

GUI 120 may display the input audio levels corresponding to each microphone. For example, input audio indicators 350 may include a first graphical representation for an input audio level corresponding to the first input audio level, a second graphical representation for an input audio level corresponding to the second input audio level, a third graphical representation for an input audio level corresponding to the third input audio level, and so on. In a particular example, a size, a color, or both, of a particular input audio level indicator or graphical representation may indicate a corresponding input audio level (e.g., volume/amplitude). For example, a first color (e.g., white) of an input audio level icon may indicate that a corresponding input audio level fails to satisfy (e.g., is below) a first audio level threshold. A second color (e.g., green) of the input audio level icon may indicate that the corresponding input audio level satisfies (e.g., is greater than) the first audio level threshold and satisfies (e.g., is less than) a second audio level threshold. A third color (e.g., yellow) of the input audio level icon may indicate that the corresponding input audio level fails to satisfy (e.g., is greater than) the second audio level threshold and satisfies (e.g., is less than) a third audio level threshold. A fourth color (e.g., red) of the input audio level icon may indicate that the corresponding input audio level fails (e.g., is greater than) the third audio level threshold. Three audio level thresholds are described for illustrative purposes. In a particular example, the input audio level indicators 350 may correspond to fewer than three or more than three audio level thresholds. The input audio level indicators 350 may indicate a microphone saturation alarm. For example, a particular color (e.g., red) may correspond to a microphone saturation alarm (i.e., the volume/amplitude of a particular input signal is nearing or has exceeded the microphone's saturation level meaning that the input signal is about to be or is being clipped).

In some examples, GUI 120 includes a slider or other selection option for a user so that microphone saturation (e.g., microphone clipping) can be avoided. For example, input audio level indicators 350 may each be associated with a microphone level adjustment slider. By adjusting the slider down or up, a user may lower or increase the microphone gain of a particular microphone or the gain of an audio channel. For example, as shown in FIG. 3G, GUI 120 may include gain adjusters 352. By enabling a user to adjust gain, the user may be able to avoid microphone saturation or be able to increase the volume of low volume audio channels, which may improve the quality of the audio the user is recording.

GUI 120 may thus provide feedback to a user regarding audio levels of input signals 108 received from microphones and audio signals 110 corresponding to channels of a generated multi-channel signal. The user may take actions based on the feedback. For example, the user may determine that one or more of the microphones are disabled based on the audio levels of the input signals and may enable the microphones accordingly. The user experience may be improved as a result. As another example, the user may determine that one or more of the microphones are clipping or otherwise saturated based on the audio levels of the input signals and may disable any offending microphone or adjust the gain of any offending microphone. The user experience may be improved as a result. In other examples, audio analyzer 114 may recognize that a microphone is disabled and automatically output a notification audio signal representative of a microphone being disabled, in an error state, or otherwise not working. This notification audio signal would enable device 102 to inform a user of the device during recording that one or more microphones are disabled, in an error state, or otherwise not working. The notification signal may be output to one or more audio channels designated as notification channels, which may or may not be local to the recording device (i.e., a speaker of the recording device or a speaker external to the device). In other examples, the notification may additionally or alternatively be another output that the device is capable of providing to a user, such as haptic feedback or select graphical information. In other examples, the notification may be included in any one of audio signals 110.

Referring to FIG. 3G, during operation, a user may use an input device (e.g., a mouse, a touchscreen, etc.) to select headset icon 354 to use headset 112 as one of the output devices 107. Audio analyzer 114 may provide audio signals 110 to the headset 112 in response to receiving a selection of the headset icon 354. Since a headset may be stereophonic, a multi-channel signal above 2-channels may be down-mixed to a multi-channel signal having 2-channels. Audio analyzer 114 may refrain from providing the audio signals 110 to the headset 112 in response to receiving another (i.e., second or subsequent) selection of the headset icon 354. In a particular example, a first color (e.g., green) of the headset icon 354 may indicate that audio analyzer 114 is providing the audio signals 110 to the headset 112 and a second color (e.g., white) of headset icon 354 may indicate that audio analyzer 114 is not (or is refraining from) providing audio signals 110 to headset 112.

A particular image corresponding to each of the channel icons 304*a-e* may indicate a corresponding output audio level, as described herein. For example, a first image corresponding to a first one of channel icons 304 having a first portion (e.g., most of the first image) of a particular color (e.g., blue) may indicate a first output audio level (e.g., high), a second image corresponding to a second one of channel icons 304 having a second portion (e.g., about half of the second image) of the particular color (e.g., blue) may indicate a second output audio level (e.g., medium), and a third image corresponding to a third one of channel icons 304 having a third portion (e.g., none of the second image) of the particular color (e.g., blue) may indicate a third output audio level (e.g., none or low).

Audio analyzer 114 may determine a stationary noise level of the audio signals 110, as shown in FIG. 3G. In some examples, the stationary noise level shown in FIG. 3G may populate in GUI 120 upon selection of one of the sectors 302 or channels 304. In such examples, the stationary noise level corresponds to a specific sector or channel. In other examples, the stationary noise level shown in FIG. 3G may correspond to the noise level across all audio signals 110 (or input signals 108). For example, audio analyzer 114 may determine the stationary noise level based on a noisiness metric (e.g., a linear prediction coding (LPC) prediction gain) of the audio signals 110 (or input signals 108). In a particular example, a lower LPC prediction gain may indicate a higher stationary noise level of audio signals 110. The noisiness metric may be defined in terms of variability of the audio signals 110 or in terms of power or energy of the audio signals 110. Output noise level indicator 356 may indicate the stationary noise level of one or more audio signals 110 (or one or more of input signals 108). As one example, a height of a particular color (e.g., red) of the output noise level indicator 356 may indicate the stationary noise level of the audio signals 110.

User 118 may move the noise suppression option 330 in a first direction (e.g., down) to decrease a noise suppression level or may move the noise suppression option 330 in a second direction (e.g., up) to increase the noise suppression level. User 118 may move the noise suppression option 330 to adjust the noise suppression level. Audio analyzer 114 may generate the audio signals 110 based on the noise suppression level. The output noise level indicator 356 may indicate the stationary noise level of the audio signals 110 or input signals 108. The output noise level icon 356 may thereby provide feedback to the user 118 regarding an effect of the selected noise suppression level on the stationary noise level of the audio signals 110 or input signals 108. Noise level indicator 356 may be presented in real-time such that it indicates an amount of background noise (also termed stationary noise) that is present within the currently recorded audio. In some examples, noise level indicator 356 may be the same or otherwise be presented similarly to noise indicator 331. For example, noise level indicator 356 may similarly include a green/blue bar arrangement to enhance visualization of measured noise compared to the amount noise remaining following noise suppression.

Each of the one or more gain adjusters (or gain options) 352 may be associated with a particular microphone. For example, a first gain option of the one or more gain options 1308 may correspond to the first microphone 104a of FIG. 1, a second gain option of the one or more gain options 1308 may correspond to the second microphone 104b, and so on. User 118 may select a particular gain option to adjust a level of gain associated with a corresponding microphone. For example, user 118 may move the first gain option in a first direction (e.g., up) to increase a first level of gain associated with the first microphone 104a. In a particular example, the particular gain option may correspond to the selectable option 140. For example, audio analyzer 114 may receive selection 130 indicating that user 118 selected the particular gain option. The selection 130 may also indicate a level of gain corresponding to the particular gain option. For example, selection 130 may indicate that user 118 moved the particular gain option a first distance in a first direction. The first distance may correspond to a first change amount and the first direction may indicate that a corresponding level of gain is to be increased (or decreased). Audio analyzer 114 may determine that the first level of gain corresponding to the particular gain option is to be increased (or decreased) by the first change amount based on the selection 130. Audio analyzer 114 may increase (or decrease) the level of gain of the corresponding microphone by the first change amount. Subsequently, the input audio level indicators 350 may be updated to indicate the input audio level corresponding to the microphone having had its gain changed. The input audio level indicators 350 may thereby provide feedback to the user 118 regarding an effect of the selected level of gain on the first input audio level corresponding to the microphone.

GUI 120 may thus provide feedback to a user during multi-channel audio generation. The user may make selections to modify the multi-channel audio generation based on the feedback, thereby improving a user experience and quality of the generated multi-channel audio.

Each GUI 120 illustrated in the figures of this disclosure may include fewer components or more components (e.g., graphical representations, selectable graphical representations, etc) than illustrated.

Figure 4:
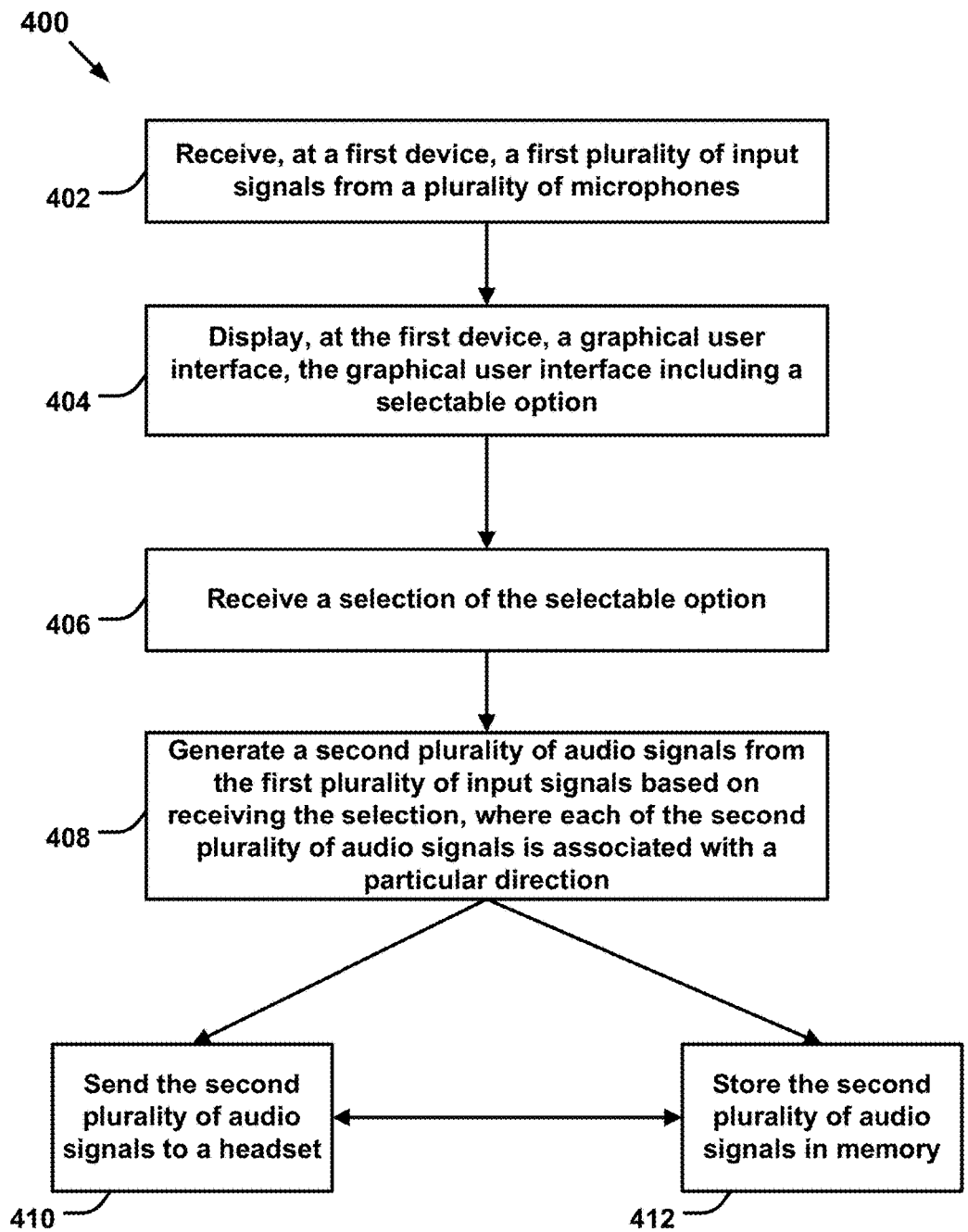
FIG. 4 is a flowchart illustrating an example operation in accordance with one or more techniques of this disclosure.

Referring to FIG. 4, a flowchart of a particular illustrative example of a method 400 of multi-channel audio generation is shown. In the example shown, one or more steps may be performed by audio analyzer 114.

The method 400 includes receiving (402), at a first device, a first plurality of input signals from a plurality of microphones. For example, audio analyzer 114 of the device 102 may receive input signals 108 from microphones 104a-c.

The method 400 also includes displaying (404), at the first device, a graphical user interface. The graphical user interface may include a selectable option to enable the user to interact with audio analyzer 114. For example, a user may interact with the representations of the graphical audio channels as presented on display 106 to adjust, among other things, audio recording parameters or audio processing parameters. Audio analyzer 114 of the device 102 may display GUI 120 as described herein.

The method 400 further includes receiving (406) a selection of the selectable option. For example, audio analyzer 114 of device 102 may receive a selection 130, as described herein.

The method 400 also includes generating (408) a second plurality of audio signals from the first plurality of input signals based on receiving the selection. For example, audio analyzer 114 may generate audio signals 110 from input signals 108 based on receiving the selection 130, as described herein. Each of the second plurality of audio signals may be associated with a particular direction. Each of the audio signals 110 may be associated with a particular direction (e.g., left, right, center, left-surround, or right-surround), as described herein.

The method 400 further includes sending (410) the second plurality of audio signals to a headset (or other output devices 107). For example, audio analyzer 114 of may send audio signals 110 to the headset 112 (or other output devices 107), as described herein.

The method 400 also includes storing (412) the second plurality of audio signals in memory. For example, audio analyzer 114 may store audio signals 110 in the GUI data 150 or information associated with or otherwise corresponding to the audio signals 110 in the GUI data 150. GUI data 150 may be stored in a memory coupled to, or included in, device 102.

The method 400 may enable generation of a multi-channel audio signal (e.g., the second plurality of audio signals) from a first plurality of input signals based on receiving a selection of a selectable option of a GUI. The method 400 may thus enable interactive generation of the multi-channel audio signal, thereby improving user experience and quality of the generated multi-channel audio signal.

Figure 5:
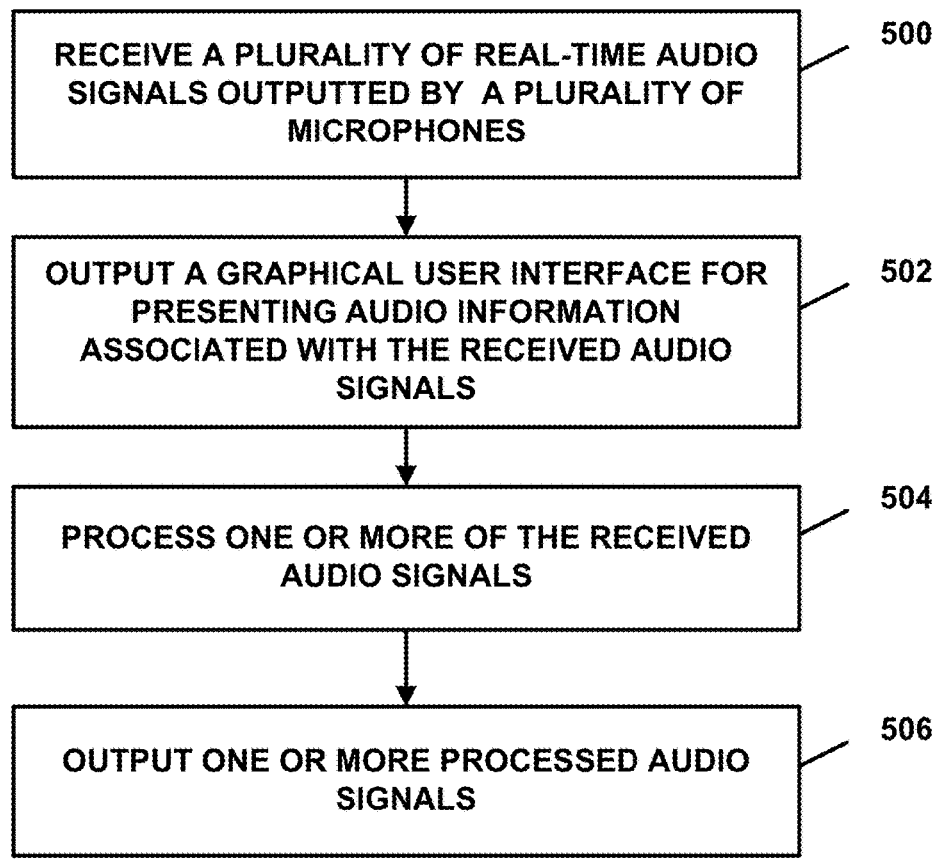
FIG. 5 is a flowchart illustrating an example operation in accordance with one or more techniques of this disclosure.

FIG. 5 is a flowchart illustrating an example operation in accordance with one or more techniques of this disclosure. In the example shown in FIG. 5, a computing device may receive (500) a plurality of real-time audio signals outputted by a plurality of microphones communicatively coupled to the computing device. For example, one or more of the plurality of microphones may be communicatively coupled to the computing device such that they are built into the device. As another example, one or more of the plurality of microphones may be communicatively coupled to the computing device such that they are not built into the device (e.g., a peripheral microphone).

The computing device may output (502), to a display, a graphical user interface (GUI) that presents audio information associated with the received audio signals. For example, the audio information may be real-time audio information. As some additional examples that may be used together in any combination or separately from one another, the audio information may include information related to each of the real-time audio signals, each of the plurality of microphones, one or more output devices, volume levels relating to one or more output devices, saturation levels of one or more microphones, or noise levels. Other examples are identified in this disclosure.

One or more of the received audio signals may be processed (504) based on a user input associated with the audio information presented via the GUI to generate one or more processed audio signals. For example, one or more processors of the computing device may process the received audio signals. As one example, one or more processors of the computing device may process the received audio signals to up-mix or down-mix the received audio signals. The up-mixing or down-mixing may be based on a channel configuration selection from the plurality of channel configuration options presented via the GUI. As another example, if there are two microphones and the channel configuration selection is indicative of three output devices (e.g., three speakers), the one or more processors may up-mix the two audio-signals from the two microphones into a three-channel multi-channel signal configured for use with the three output devices. As another example, if there are three microphones and the channel configuration selection is indicative of two output devices (e.g., two speakers), the one or more processors may down-mix the three audio-signals from the three microphones into a two-channel multi-channel signal configured for use with the two output devices.

As another example, one or more processors of the computing device may process the received audio signals to filter the received audio signals. The filtering may be based on a noise suppression selection from the one or more noise suppression options presented via the GUI.

As another example, one or more processors of the computing device may process the received audio signals to process a first audio signal of the plurality of audio signals such that the first audio signal is associated with a first audio channel before processing and the first audio signal is associated with a second audio channel after processing. As yet another example, one or more processors of the computing device may process the received audio signals to process a first audio signal of the plurality of audio signals such that the first audio signal is only associated with a first audio channel before processing and the first audio signal is only associated with a second audio channel after processing.

One or more processed audio signals may be output (506). For example, one or more processed audio signals may be output to an output device such as a speaker or headset.

Figure 6:
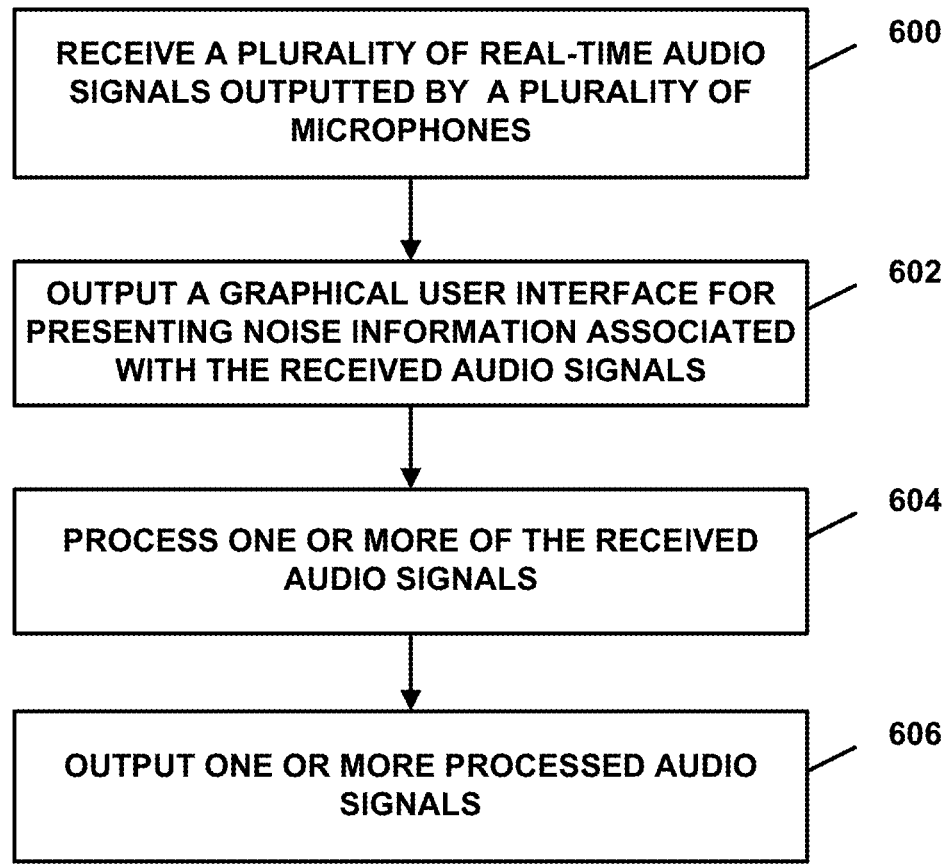
FIG. 6 is a flowchart illustrating an example operation in accordance with one or more techniques of this disclosure.

FIG. 6 is a flowchart illustrating an example operation in accordance with one or more techniques of this disclosure. In the example shown in FIG. 6, a computing device may receive (600) a plurality of real-time audio signals outputted by a plurality of microphones communicatively coupled to the computing device. For example, one or more of the plurality of microphones may be communicatively coupled to the computing device such that they are built into the device. As another example, one or more of the plurality of microphones may be communicatively coupled to the computing device such that they are not built into the device (e.g., a peripheral microphone). In some examples, the computing device may generate audio information associated with the received audio signals for storage in a memory. For example, the memory may be any memory disclosed herein, such as a memory associated with one or more of the plurality of microphones, a memory associated with an interface associated with one or more of the plurality of microphones, a memory associated with a CPU, GPU, or other processor, a system memory, and the like. The memory may be a combination of one or more memories described in this disclosure. The memory may be internal or external. For example, the memory may be internal to a CPU, GPU, or other processor, or the memory may be external to a CPU, GPU, or other processor. The memory may constitute temporary memory space, permanent memory space, or a combination thereof.

The computing device may output (602), to a display, a graphical user interface (GUI) that presents noise information associated with one or more of the received audio signals. For example, the noise information may be real-time audio information associated with one or more of the received audio signals. As another example, the noise information presented via the GUI includes information related to the amount of noise corresponding to one or more of the received audio signals, and wherein the GUI includes one or more noise suppression options.

One or more of the received audio signals may be processed (604) based on a user input associated with the noise information presented via the GUI to generate one or more processed audio signals. For example, one or more processors of the computing device may process the received audio signals. As one example, one or more processors of the computing device may process the received audio signals to calculate an amount of noise corresponding to one or more of the received audio signals. As another example, one or more processors of the computing device may process the received audio signals to filter the received audio signals based on a noise suppression selection from the one or more noise suppression options presented via the GUI. In some examples, filtering may include attenuating noise in one or more of the received audio signals.

In some examples, one or more processors of the computing device may detect a scene corresponding to a type of location of where the computing device is located, determine whether to recommend noise suppression based on the detected scene corresponding to the type of location, present the determined noise suppression recommendation via the GUI, or any combination thereof. In one example, detecting a scene may be based on one or more of an image captured by the computing device using a camera or one or more of the received audio signals.

One or more processed audio signals may be output (606). For example, one or more processed audio signals may be output to an output device such as a speaker or headset.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Those of ordinary skill in the art will appreciate that one or more circuits, processors, and/or software may be used to implement the methods and processes described herein. Circuits refers to any circuit, whether integrated or external to a processing unit. Software refers to code or instructions executable by a processing unit to achieve the desired result. This software may be stored locally on a storage medium of the device such as the memory of a processing unit, system memory, or other memory.

The previous description of the disclosed examples is provided to enable a person skilled in the art to make or use the disclosed examples. Various modifications to these examples will be readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. A method of processing audio data, the method comprising:
   receiving, by a computing device, a plurality of real-time audio signals from a plurality of microphones communicatively coupled to the computing device, wherein the plurality of real-time audio signals collectively form a surround sound recording (SSR) of the audio data;
   determining a type of location associated with the SSR;
   determining, based on the type of location associated with the SSR, one or more noise suppression levels with respect to the received plurality of real-time audio signals;
   outputting, to a display, a graphical user interface (GUI) that presents one or more noise suppression options corresponding to one or more noise suppression levels of the one or more noise suppression levels determined based on the type of location associated with the SSR;
   receiving, via the GUI, a user input indicating a selected noise suppression option from the one or more noise suppression options presented via the GUI;
   processing one or more of the received plurality of audio signals based on the respective noise suppression level of the selected noise suppression option to generate a noise-suppressed SSR of the audio data; and
   outputting the noise-suppressed SSR of the audio data.

2. The method of claim 1, further comprising detecting an amount of noise corresponding to one or more of the received plurality of audio signals, wherein determining the one or more noise suppression levels with respect to the received plurality of real-time audio signals comprises determining the one or more noise suppression levels further based on the detected amount of noise.

3. The method of claim 2, wherein outputting the GUI comprises outputting the GUI to include information related to the detected amount of noise, and the one or more noise suppression options.

4. The method of claim 2, wherein outputting the GUI comprises outputting the GUI to include a spatial presentation of the information related to the detected amount of noise via a dynamic graphical representation for an audio channel that is configured to change based on one or more changes to a portion of the detected amount of noise corresponding to the audio channel.

5. The method of claim 1, wherein processing the one or more of the received plurality of audio signals comprises filtering the processed one or more of the received plurality of audio signals based on the respective noise suppression level of the selected noise suppression option.

6. The method of claim 5, wherein filtering the processed one or more of the received plurality of audio signals comprises attenuating noise data in the processed one or more of the received plurality of audio signals.

7. The method of claim 1, further comprising:
   detecting a scene corresponding to a location of the computing device, wherein determining the type of location comprises determining the type of location based on the detected scene;
   determining, based on the type of location, a noise suppression recommendation that corresponds to one of the one or more noise suppression options presented via the GUI; and
   presenting the determined noise suppression recommendation via the GUI.

8. The method of claim 7, wherein detecting the scene comprises detecting the scene based on one or more of an image captured by the computing device using a camera, audio data of one or more of the received plurality of audio signals, one or more global positioning system (GPS) coordinates corresponding to the location of the computing device, or one or more GPS coordinates corresponding to a location of one or more of the plurality of microphones.

9. An apparatus comprising:
   an interface configured to receive a plurality of real-time audio signals from a plurality of microphones coupled to the apparatus;
   a memory coupled to the interface, the memory being configured to store the received plurality of audio signals; and
   one or more processors coupled to the memory, the one or more processors being configured to:
      generate a surround sound recording (SSR) of audio data using the plurality of audio signals stored in the memory;
      determine a type of location associated with the SSR;
      determine, based on the type of location associated with the SSR, one or more noise suppression levels with respect to the plurality of real-time audio signals stored to the memory;
      output, for display, graphical content of a graphical user interface (GUI) that presents one or more the noise suppression options corresponding to one or more noise suppression levels of the one or more noise suppression levels determined based on the type of location associated with the SSR;
      receive, via the GUI, a user input indicating a selected noise suppression option from the one or more noise suppression options presented via the GUI;

process one or more of the plurality of audio signals stored to the memory based on the respective noise suppression level of the selected noise suppression option to generate a noise-suppressed SSR of the audio data; and output the noise-suppressed SSR of the audio data.

10. The apparatus of claim 9, wherein the one or more processors are configured to detect an amount of noise corresponding to one or more of the plurality of audio signals stored to the memory, and wherein to determine the one or more noise suppression of with respect to the plurality of real-time audio signals, the one or more processors are configured to determine the one or more noise suppression levels further based on the detected amount of noise.

11. The apparatus of claim 10, wherein to output the GUI, the one or more processors are configured to output the GUI to include information related to the detected amount of noise, and the one or more noise suppression options.

12. The apparatus of claim 10, wherein to output the GUI, the one or more processors are configured to output the GUI to include a spatial presentation of the information related to the detected amount of noise via a dynamic graphical representation for an audio channel that is configured to change based on one or more changes to a portion of the detected amount of noise corresponding to the audio channel.

13. The apparatus of claim 9, wherein to process the one or more of the plurality of audio signals stored to the memory, the one or more processors are configured to filter the processed one or more of the plurality of audio signals stored to the memory based on the respective noise suppression level of the selected noise suppression option.

14. The apparatus of claim 13, wherein to filter the one or more of the plurality of audio signals stored to the memory, the one or more processors are configured to attenuate noise data in the one or more of the plurality of audio signals stored in the memory.

15. The apparatus of claim 9, wherein the one or more processors are further configured to:
 detect a scene corresponding to a location of the computing device, wherein to determine the type of location, the one or more processors are configured to determine the type of location based on the detected scene;
 determine, based on the type of location, a noise suppression recommendation that corresponds to one of the one or more noise suppression options presented via the GUI; and
 present the determined noise suppression recommendation via the GUI.

16. The apparatus of claim 15, wherein the one or more processors are configured to detect the scene based on one or more of an image captured by a camera coupled to the computing device, audio data of the one or more of the plurality of audio signals stored in the memory, one or more global positioning system (GPS) coordinates corresponding to the location of the computing device, or one or more GPS coordinates corresponding to a location of one or more of the plurality of microphones.

17. A device comprising:
 means for receiving a plurality of real-time audio signals from a plurality of microphones communicatively coupled to the device, wherein the plurality of real-time audio signals collectively form a surround sound recording (SSR) of the audio data;
 means for determining a type of location associated with the SSR;
 means for determining, based on the type of location associated with the SSR, one or more noise suppression levels with respect to the received plurality of real-time audio signals;
 means for outputting, for display, a graphical user interface (GUI) that presents one or more noise suppression options corresponding to one or more noise suppression levels of the one or more noise suppression levels determined based on the type of location associated with the SSR;
 means for receiving, via the GUI, a user input indicating a selected noise suppression option from the one or more noise suppression options presented via the GUI;
 means for processing one or more of the received plurality of audio signals based on the respective noise suppression level of the selected noise suppression option to generate a noise-suppressed SSR of the audio data; and
 means for outputting the noise-suppressed SSR of the audio data.

18. The device of claim 17, further comprising means for detecting an amount of noise corresponding to one or more of the received plurality of audio signals, wherein the means for determining the one or more noise suppression levels with respect to the received plurality of real-time audio signals comprises means for determining the one or more noise suppression levels further based on the detected amount of noise.

19. The device of claim 18, wherein the means for outputting the GUI comprises means for outputting the GUI to include a spatial presentation of the information related to the detected amount of noise via a dynamic graphical representation for an audio channel that is configured to change based on one or more changes to a portion of the amount of noise corresponding to the audio channel.

20. The device of claim 18, wherein the means for outputting the GUI comprises means for outputting the GUI to include information related to the detected amount of noise, and the one or more noise suppression options.

21. The device of claim 17, wherein the means for processing the one or more of the received plurality of audio signals comprises means for filtering the processed one or more of the received plurality of audio signals based on the respective noise suppression level of the selected noise suppression option.

22. The device of claim 21, wherein the means for filtering the processed one or more of the received plurality of audio signals comprises means for attenuating noise data in the processed one or more of the received plurality of audio signals.

23. The device of claim 17, further comprising:
 means for detecting a scene corresponding to a location of the device, wherein the means for determining the type of location comprises means for determining the type of location based on the detected scene;
 means for determining, based on the type of location, a noise suppression recommendation that corresponds to one of the one or more noise suppression options presented via the GUI; and
 means for presenting the determined noise suppression recommendation via the GUI.

24. The device of claim 23, wherein the means for detecting the scene comprises means for detecting the scene based on one or more of an image captured by an image capture means coupled to the device, audio data of one or more of the received plurality of audio signals, one or more global positioning system (GPS) coordinates corresponding to the location of the computing device, or one or more GPS coordinates corresponding to a location of one or more of the plurality of microphones.

25. A non-transitory computer-readable storage medium having instructions stored thereon that, when executed, cause one or more processors of a computing device to:
   receive a plurality of real-time audio signals from a plurality of microphones communicative coupled to the computing device, wherein the plurality of real-time audio signals collectively form a surround sound recording (SSR) of the audio data;
   determine a type of location associated with the SSR;
   determine, based on the type of location associated with the SSR, one or more noise suppression levels with respect to the received plurality of real-time audio signals;
   output, to a display, graphical content of a graphical user interface (GUI) that presents one or more noise suppression options corresponding to one or more noise suppression levels of the one or more noise suppression levels determined based on the type of location associated with the SSR;
   receive, via the GUI, a user input indicating a selected noise suppression option from the one or more noise suppression options presented via the GUI;
   process one or more of the received plurality of audio signals based on the respective noise suppression level of the selected noise suppression option, a noise-suppressed SSR of the audio data; and
   output the noise-suppressed SSR of the audio data.

26. The non-transitory computer-readable storage medium of claim 25, further having stored thereon instructions that, when executed, cause the one or more processors of the computing device to detect an amount of noise corresponding to one or more of the received plurality of audio signals, wherein the instructions that cause the one or more processors to determine the one or more noise suppression of with respect to the received plurality of real-time audio signals comprise instructions that, when executed, cause the one or more processors to determine the one or more noise suppression levels further based on the detected amount of noise.

27. The non-transitory computer-readable storage medium of claim 26, wherein the instructions that cause the one or more processors to output the GUI comprise instructions that, when executed, cause the one or more processors to output the GUI to include a spatial presentation of the information related to the detected amount of noise via a dynamic graphical representation for an audio channel that is configured to change based on one or more changes to a portion of the detected amount of noise corresponding to the audio channel.

28. The non-transitory computer-readable storage medium of claim 26, wherein the instructions that cause the one or more processors to output the GUI comprise instructions that, when executed, cause the one or more processors to output the GUI to include information related to the detected amount of noise, and the one or more noise suppression options.

29. The non-transitory computer-readable storage medium of claim 26, wherein the instructions that cause the one or more processors to process the received plurality of audio signals comprise instructions that, when executed, cause the one or more processors to filter the processed one or more of the received plurality of audio signals based on the respective noise suppression level of the selected noise suppression option.

30. The non-transitory computer-readable storage medium of claim 29, wherein the instruction that cause the one or more processors to filter the processed one or more of the received plurality of audio signals comprise instructions that, when executed, cause the one or more processors to attenuate noise data in the processed one or more of the received plurality of audio signals.

* * * * *